United States Patent
Yin et al.

(10) Patent No.: US 9,537,616 B2
(45) Date of Patent: Jan. 3, 2017

(54) SYSTEMS AND METHODS FOR SUBFRAME OFFSET

(71) Applicant: Sharp Laboratories of America, Inc., Camas, WA (US)

(72) Inventors: Zhanping Yin, Vancouver, WA (US); Shohei Yamada, Osaka (JP)

(73) Assignee: Sharp Laboratories of America, Inc., Camas, WA (US)

( * ) Notice: Subject to any disclaimer, the term of this patent is extended or adjusted under 35 U.S.C. 154(b) by 117 days.

(21) Appl. No.: 14/497,210

(22) Filed: Sep. 25, 2014

(65) Prior Publication Data

US 2015/0085719 A1   Mar. 26, 2015

Related U.S. Application Data

(60) Provisional application No. 61/883,148, filed on Sep. 26, 2013.

(51) Int. Cl.
*H04W 72/12* (2009.01)
*H04L 1/18* (2006.01)
(Continued)

(52) U.S. Cl.
CPC ............ *H04L 1/1896* (2013.01); *H04L 5/001* (2013.01); *H04L 5/0055* (2013.01); *H04L 5/1469* (2013.01); *H04L 1/1854* (2013.01); *H04L 1/1861* (2013.01)

(58) Field of Classification Search
CPC ...... H04L 1/1896; H04L 5/0055; H04L 5/001; H04L 5/1469; H04L 1/1854; H04L 1/1861; H04L 1/18; H04W 72/0453; H04W 72/044; H04W 28/0215; H04W 72/048; H04W 76/023; H04W 76/043

See application file for complete search history.

(56) References Cited

U.S. PATENT DOCUMENTS 8,472,471 B2   6/2013   Yang et al.
2013/0017841 A1   1/2013   Kazmi et al.
(Continued)

FOREIGN PATENT DOCUMENTS

WO   2012/149456   11/2012

OTHER PUBLICATIONS

Motorola Mobility, "Finalisation for Introducing Rel-11 Features," 3GPP TSG-RAN WG1 Meeting #71, R1-125404, Nov. 2012.
(Continued)

*Primary Examiner* — Charles C Jiang
*Assistant Examiner* — Rose Clark
(74) *Attorney, Agent, or Firm* — Austin Rapp & Hardman

(57) ABSTRACT

A user equipment (UE) is described. The UE determines a duplex method of each serving cell for frequency-division duplexing (FDD) and time-division duplexing (TDD) carrier aggregation. At least one serving cell is a TDD cell and at least one serving cell is a FDD cell. The UE also determines a subframe offset. The UE further determines physical downlink shared channel (PDSCH) Hybrid Automatic Repeat Request Acknowledgement/Negative Acknowledgement (HARQ-ACK/NACK) transmission timing for a serving cell. When a primary cell is a TDD cell, the PDSCH HARQ-ACK/NACK transmission timing for the serving cell is determined based on a downlink (DL) association set with the subframe offset for the serving cell. The UE additionally sends PDSCH HARQ-ACK/NACK information based on the PDSCH HARQ-ACK/NACK transmission timing.

28 Claims, 25 Drawing Sheets

(51) Int. Cl.
*H04L 5/00* (2006.01)
*H04L 5/14* (2006.01)

(56) References Cited

U.S. PATENT DOCUMENTS

| | | |
|---|---|---|
| 2013/0229953 A1 | 9/2013 | Nam et al. |
| 2013/0316727 A1* | 11/2013 | Edge ................. H04W 4/02 455/456.1 |
| 2013/0343239 A1* | 12/2013 | Damnjanovic ......... H04L 5/001 370/280 |
| 2014/0293893 A1* | 10/2014 | Papasakellariou .... H04W 72/04 370/329 |
| 2015/0271862 A1* | 9/2015 | Lee .................... H04W 76/023 370/278 |
| 2015/0304095 A1* | 10/2015 | Larsson ............... H04L 1/1861 370/280 |
| 2016/0044552 A1* | 2/2016 | Heo .................. H04W 36/0083 370/331 |
| 2016/0044740 A1* | 2/2016 | Siomina ............... H04W 72/02 455/552.1 |

OTHER PUBLICATIONS

Nokia Corporation, "New WI: LTE TDD-FDD Joint Operation," 3GPP TSG RAN Meeting #60, RP-130862, Jun. 2013.
MCC Support, "Draft Report of 3GPP TSG RAN WG1 #74, v0.1.0," Section 7.2.5, 3GPP TSG RAN WG1 Meeting #74bis, Oct. 2013.
CMCC, "Email Summary on FDD and TDD Joint Operation," 3GPP TSG-RAN WG1 #74, R1-133811, Aug. 2013.

* cited by examiner

SYSTEMS AND METHODS FOR SUBFRAME OFFSET

RELATED APPLICATIONS

This application is related to and claims priority from U.S. Provisional Patent Application Ser. No. 61/883,148 filed Sep. 26, 2013, for SUBFRAME OFFSET IN TDD-FDD CARRIER AGGREGATION, with inventor Zhanping Yin and Shohei Yamada, which is incorporated herein by reference.

TECHNICAL FIELD

The present disclosure relates generally to communication systems. More specifically, the present disclosure relates to systems and methods for subframe offset.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
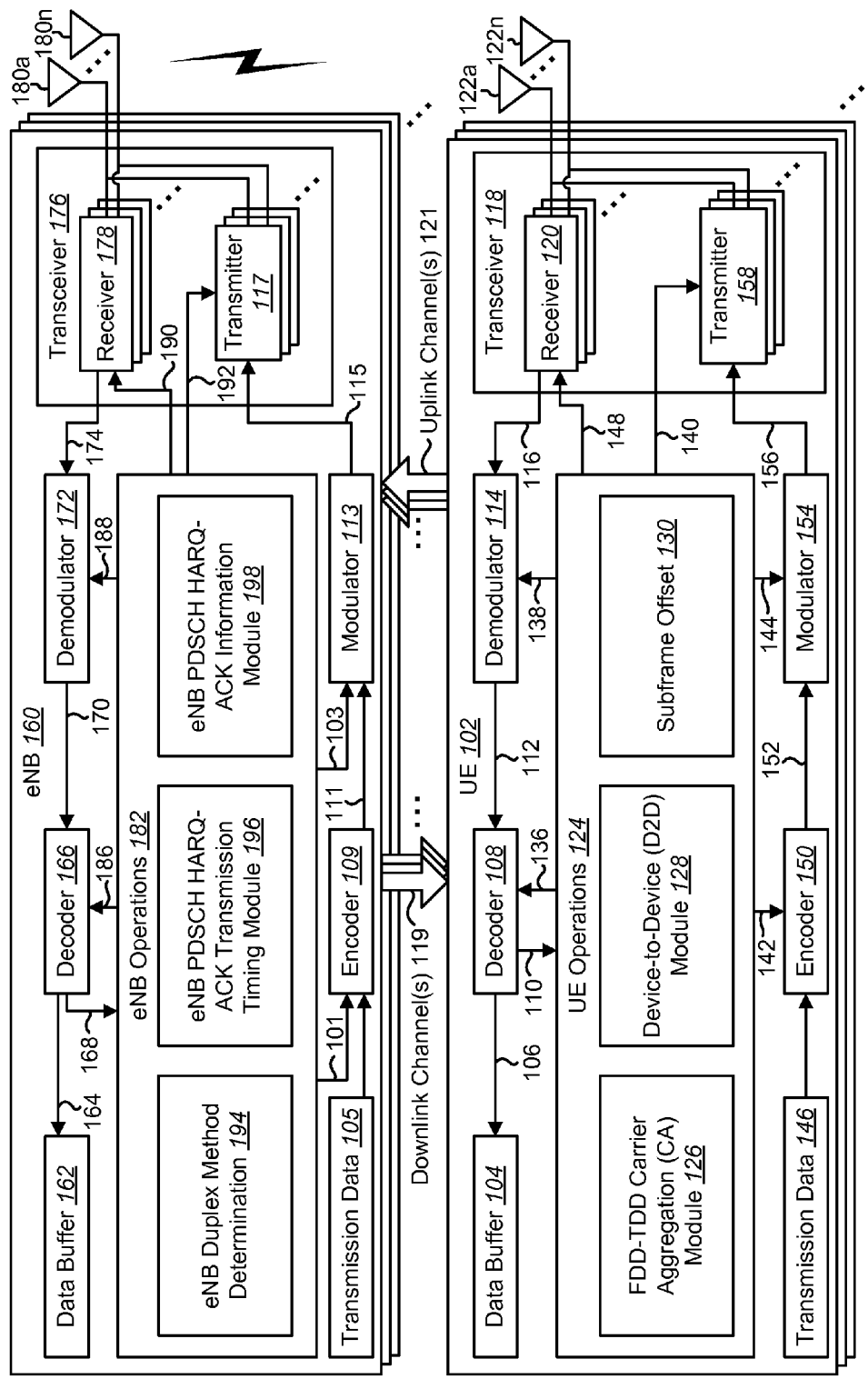
FIG. 1 is a block diagram illustrating one implementation of one or more evolved NodeBs (eNBs) and one or more user equipments (UEs) in which systems and methods for subframe offset may be implemented.

A UE for performing carrier aggregation is described. The UE includes a processor and memory in electronic communication with the processor. Instructions stored in the memory are executable to determine a duplex method of each serving cell for FDD and TDD carrier aggregation. At least one serving cell is a TDD cell and at least one serving cell is a FDD cell. The instructions are also executable to determine a subframe offset. The instructions are further executable to determine physical downlink shared channel (PDSCH) Hybrid Automatic Repeat Request Acknowledgement/Negative Acknowledgement (HARQ-ACK) transmission timing for a serving cell. The terms "HARQ-ACK" and "HARQ-ACK/NACK" are used interchangeably herein to refer to Hybrid Automatic Repeat Request Acknowledgement/Negative Acknowledgement.When a primary cell is a TDD cell, the PDSCH HARQ-ACK transmission timing for the serving cell is determined based on a downlink (DL) association set with the subframe offset for the serving cell. The instructions are additionally executable to send PDSCH HARQ-ACK information based on the PDSCH HARQ-ACK transmission timing.

The subframe offset may be used to derive a DL-reference configuration of an FDD secondary cell (SCell) based on a TDD configuration with an offset. Timing references may also be defined with an offset value when the TDD and FDD cells are not synchronized at radio frame level. The offset value may be used to indicate a number of transmission time intervals (TTIs) or subframes to be shifted on the SCell for subframe index synchronization.

A method for performing carrier aggregation by a UE is also described. The method includes determining a duplex method of each serving cell for FDD and TDD carrier aggregation. At least one serving cell is a TDD cell and at least one serving cell is a FDD cell. The method also includes determining a subframe offset. The method further includes determining PDSCH HARQ-ACK transmission timing for a serving cell. When a primary cell is a TDD cell, the PDSCH HARQ-ACK transmission timing for the serving cell is determined based on a DL association set with the subframe offset for the serving cell. The method additionally includes sending PDSCH HARQ-ACK information based on the PDSCH HARQ-ACK transmission timing.

A UE for performing LTE D2D proximity service ("ProSe") is also described. The UE includes a processor and memory in electronic communication with the processor. Instructions stored in the memory are executable to determine a duplex method of each serving cell. The instructions are also executable to determine that D2D proximity service (ProSe) is configured on at least one serving cell. The instructions are further executable to determine a D2D resource allocation based on a subframe bitmap. The instructions are additionally executable to determine a subframe offset. The instructions are also executable to determine PDSCH HARQ-ACK transmission timing for a serving cell configured with D2D service. The instructions are further executable to send PDSCH HARQ-ACK information based on the PDSCH HARQ-ACK transmission timing. The instructions are additionally executable to perform D2D service on the subframes indicated by the D2D subframe bitmap.

When the UE is out-of-coverage a synchronization source may be used to perform subframe synchronization. All subframes may be configured as D2D resources. When the UE is in coverage, the subframe offset may be used on a DL-reference UL/DL configuration to fit a D2D subframe bitmap.

For an FDD cell with ProSe, the instructions may be further executable to apply a DL-reference UL/DL configuration to a UL carrier. FDD-TDD CA timing may be used for PDSCH HARQ-ACK reporting. The D2D subframe bitmap may be configured so that the D2D resources are from UL subframes that are not indicated as UL subframes in the DL-reference UL/DL configuration. In the D2D subframe bitmap, the second subframe of the FDD UL carrier may not be configured as a D2D resource. The maximum number of continuous subframes for the D2D resource may be 9. The DL-reference UL/DL configuration may be determined by the D2D subframe bitmap based on a UL/DL configuration with a maximum number of UL subframes that are not configured as D2D resources.

For an FDD cell with ProSe, the instructions may be further executable to apply a DL-reference UL/DL configuration with subframe offset to a UL carrier. FDD-TDD CA timing with subframe offset may be used for PDSCH HARQ-ACK reporting. The D2D subframe bitmap may be configured so that the D2D resources are from UL subframes that are not indicated as UL subframes in the DL-reference UL/DL configuration with subframe offset. Any subframe may be configurable as a D2D resource. The maximum number of continuous subframes for D2D resources may be 9. For each radio frame included in the D2D subframe bitmap, at least one subframe with the same subframe index may not be configured as a D2D resource. The DL-reference UL/DL configuration with subframe offset may be determined by the D2D subframe bitmap based on a UL/DL configuration with a maximum number of UL subframes that are not configured as D2D resources.

If a TDD cell is configured with UL/DL configuration 5 and D2D service, then for a subframe that is configured as a D2D resource by the subframe bitmap, if there is a WAN LTE UL transmission, the instructions may be further executable to transmit the WAN LTE UL. The instructions may also be executable to ignore a D2D transmission and reception.

For a TDD cell with ProSe, the instructions may be further executable to configure a DL-reference UL/DL configuration over the TDD UL/DL configuration of a serving cell. A UL subframe of the DL-reference UL/DL configuration may be a subset of UL subframes of a TDD UL/DL configuration of the serving cell. The DL-reference UL/DL configuration timing may be used for PDSCH HARQ-ACK reporting. The D2D subframe bitmap may be configured so that the D2D resources are from the UL subframes that are not indicated as UL subframes in a DL-reference UL/DL configuration. A second subframe of the D2D subframe bitmap may not be configured as a D2D resource. The maximum number of continuous subframes for the D2D resource may be one less than the number of UL subframes in a radio frame for the TDD cell UL/DL configuration. The DL-reference UL/DL configuration may be determined by the D2D subframe bitmap based on a UL/DL configuration with a maximum number of UL subframes that are not configured as D2D resources.

For a TDD cell with ProSe, the instructions may be further executable to configure a DL-reference UL/DL configuration with subframe offset over a TDD UL/DL configuration of a serving cell. A UL subframe of a DL-reference UL/DL configuration with subframe offset may be a subset of UL subframes of a TDD UL/DL configuration of the serving cell. A DL-reference UL/DL configuration timing with subframe offset may be used for PDSCH HARQ-ACK reporting. The D2D subframe bitmap may be configured so that the D2D resources are from the UL subframes that are not indicated as UL subframes in the DL-reference UL/DL configuration. Any subframe may be configurable as a D2D resource. The maximum number of continuous subframes for D2D resources may be one less than the number of UL subframes in a radio frame for the TDD cell UL/DL configuration. For each radio frame included in the D2D subframe bitmap, at least one subframe with the same subframe index in each radio frame may not be configured as a D2D resource. The DL-reference UL/DL configuration with subframe offset may be determined by the D2D subframe bitmap based on a UL/DL configuration with a maximum number of UL subframes that are not configured as D2D resources.

A method for performing LTE D2D proximity service (ProSe) by a UE is also described. The method includes determining a duplex method of each serving cell. The method also includes determining that D2D proximity service (ProSe) is configured on at least one serving cell. The method further includes determining a D2D resource allocation based on a subframe bitmap. The method additionally includes determining a subframe offset. The method also includes determining PDSCH HARQ-ACK transmission timing for a serving cell configured with D2D service. The method further includes sending PDSCH HARQ-ACK information based on the PDSCH HARQ-ACK transmission timing. The method additionally includes performing D2D service on the subframes indicated by the D2D subframe bitmap.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10 and/or 11). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an eNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may refer to any set of communication channels over which the protocols for communication between a UE and eNB that may be specified by standardization or governed by regulatory bodies to be used for International Mobile Telecommunications-Advanced (IMT-Advanced) or its extensions and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed herein describe carrier aggregation. In some implementations, the systems and methods disclosed herein describe LTE enhanced carrier aggregation (eCA) with hybrid duplexing. In particular, the systems and methods describe downlink (DL) association sets and PDSCH HARQ-ACK transmission timings that may be used in time division duplexing (TDD) and frequency division duplexing (FDD) carrier aggregation (CA). In one case, a primary cell (PCell) may report uplink control information (UCI). In another case, a secondary cell (SCell) may be configured as a reporting cell for the UCI.

Currently, there are two LTE duplex systems, FDD and TDD. However, under current approaches, FDD and TDD systems cannot work together for CA. For example, under known approaches (e.g., LTE Release-10 (hereafter "Release-10") and LTE Release-11 (hereafter "Release-11")), carrier aggregation (CA) is allowed for either multiple FDD cells (e.g., FDD serving cells), or multiple TDD cells (e.g., TDD serving cells), but not a hybrid of both types of cells.

Carrier aggregation refers to the concurrent utilization of more than one carrier. In carrier aggregation, more than one cell may be aggregated to a UE. In one example, carrier aggregation may be used to increase the effective bandwidth available to a UE. The same TDD uplink-downlink (UL/DL) configuration has to be used for TDD CA in Release-10, and for intra-band CA in Release-11. In Release-11, inter-band TDD CA with different TDD UL/DL configurations is supported. The inter-band TDD CA with different TDD UL/DL configurations may provide the flexibility of a TDD network in CA deployment. Furthermore, enhanced interference management with traffic adaptation (eIMTA) (also referred to as dynamic UL/DL reconfiguration) may allow flexible TDD UL/DL reconfiguration based on the network traffic load. However, CA in a hybrid duplexing network (e.g., a network with both FDD and TDD cells) is not supported in any current approach.

It should be noted that the term "concurrent" and variations thereof as used herein may denote that two or more events may overlap each other in time and/or may occur near in time to each other. Additionally, "concurrent" and variations thereof may or may not mean that two or more events occur at precisely the same time.

An FDD cell requires spectrum (e.g., radio communication frequencies or channels) in which contiguous subsets of the spectrum are entirely allocated to either UL or DL but not both. Accordingly, FDD may have carrier frequencies that are paired (e.g., paired DL and UL carrier frequencies). However, TDD does not require paired channels. Instead, TDD may allocate UL and DL resources on the same carrier frequency. Therefore, TDD may provide more flexibility on spectrum usage. With the increase in wireless network traffic, and as spectrum resources become very precious, new allocated spectrum tends to be fragmented and has smaller bandwidth, which is more suitable for TDD and/or small cell deployment. Furthermore, TDD may provide flexible channel usage through traffic adaptation with different TDD UL/DL configurations and dynamic UL/DL re-configuration.

The DL association set and PDSCH HARQ-ACK reporting are important issues for TDD-FDD CA. This is especially true if a TDD cell is used as the PCell or reporting cell, where the FDD DL subframes need to be associated with the TDD UL subframes. To maximize the DL usage on an FDD cell, a fixed TDD UL/DL configuration with maximum allocation (e.g., configuration 5 for 10 ms periodicity and configuration 2 for 5 ms periodicity) can be configured for the FDD cell. However, in this case, some UL subframes may be loaded with many HARQ-ACK reports while other UL subframes are not used. Furthermore, the DL subframes cannot be used to schedule PDSCH transmissions for TDD-FDD CA UEs because there is no DL association for the given subframe.

Methods need to be developed to distribute the HARQ-ACK reports of TDD-FDD CA UEs into the UL subframes. Methods also need to be developed to assign DL resource by disallowing the PDSCH on different DL subframes for different UEs. Implementing these methods may provide the benefit of more robust HARQ-ACK operations.

Furthermore, allocating resources for ProSe may cause some problems on existing DL and UL operations due to disrupted HARQ-ACK timing. The described systems and methods provide channel resource allocation for ProSe while avoiding possible dropping or collision of PDSCH HARQ-ACK reports at UE side. This also introduces subframe limitations on D2D resource allocation. The described systems and methods provide approaches to handle potential UL scheduling and HARQ-ACK report issues with D2D resource allocation.

Avoiding collision between D2D and WAN while providing HARQ-ACK feedback for all DL subframes of a cell may provide the following benefits. A peak DL throughput for a UE may be maintained. Additionally, the network may maintain D2D service integrity.

The use of a subframe offset on a DL-reference UL/DL configuration on a FDD or TDD cell may provide the following benefits. The use of a subframe offset may provide fewer limitations on the D2D subframe bitmap. This may also provide more flexibility of network operation.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more eNBs 160 and one or more UEs 102 in which systems and methods for subframe offset may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

The UE 102 and the eNB 160 may use one or more channels 119, 121 to communicate with each other. For example, a UE 102 may transmit information or data to the eNB 160 using one or more uplink channels 121. Examples of uplink channels 121 include a PUCCH and a PUSCH, etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include one or more of an FDD-TDD carrier aggregation (CA) module 126 and a device-to-device (D2D) operation module 128.

The FDD-TDD CA module 126 may determine a duplex method of each serving cell for FDD and TDD carrier aggregation. The UE 102 may be located in a wireless communication network in which carrier aggregation may be performed with one or more FDD cells and one or more TDD cells. In one implementation, the wireless communication network may be an LTE network.

The UE 102 may communicate with an eNB 160 over a serving cell using either FDD or TDD duplexing. The FDD-TDD CA module 126 may determine the duplex method of each of the configured serving cells used in FDD and TDD carrier aggregation. In other words, the UE duplex method determination module 126 may determine whether a serving cell is an FDD cell or a TDD cell.

The FDD-TDD CA module 126 may determine a subframe offset 130 (or a subframe shift). The eNB 160 may signal an offset 130 value to the TDD configuration on an FDD cell to distribute the HARQ-ACK reporting from different UEs 102 into different UL subframes of a TDD PCell or reporting cell, to utilize the DL subframes of an FDD cell for different UEs 102, and to derive the DL-reference configuration of the FDD SCell based on a TDD configuration with an offset 130. Using the subframe offset 130 may provide a solution for timing references for TDD and FDD carrier aggregation. This is especially true if a TDD configuration or a DL association pattern based on a TDD configuration that is applied on an FDD cell.

The FDD-TDD CA module 126 may determine PDSCH HARQ-ACK transmission timing for a serving cell. A TDD cell may follow a DL-reference UL/DL configuration of the TDD cell for the DL association set and the PDSCH HARQ-ACK timing. For example, the DL association set may be determined based on the DL-reference UL/DL configuration. The DL association set then may define the PDSCH HARQ-ACK timing of the serving cell.

However, for an FDD cell, an FDD DL association set may be defined for all seven TDD UL/DL configurations. Therefore, when FDD and TDD CA is used, and a TDD cell is the PCell or the PUCCH reporting cell for PDSCH HARQ-ACK feedback, the one or more FDD serving cells may use the FDD DL association set determined according to the DL-reference UL/DL configuration of the PCell and/or the PUCCH reporting cell.

In one case, the PUCCH is transmitted only on a primary cell (PCell). In this case, the PCell may be either an FDD cell or a TDD cell. In one scenario, an FDD cell is the PCell. In this scenario, all cells (including FDD and TDD secondary cells (SCells)) may follow the FDD timing of the PCell. The PDSCH transmission in subframe n–4 may be acknowledged in subframe n. The PDSCH HARQ-ACK information of all cells may be aggregated and reported on the PUCCH of the PCell or a PUSCH with the lowest Cell_ID.

In another scenario, a TDD cell is the PCell. In this scenario, the PDSCH HARQ-ACK information of all serving cells may be aggregated and reported on the PUCCH of the PCell or a PUSCH with the lowest Cell_ID. The DL association set and PDSCH HARQ-ACK transmission timing of an aggregated cell may follow a DL-reference UL/DL configuration. In one implementation, the DL-reference UL/DL configuration of the TDD PCell is the PCell UL/DL configuration (e.g., the TDD UL/DL configuration of the PCell). The DL-reference UL/DL configuration of the PCell may be used to determine the DL association set of the PCell. The FDD-TDD CA module 126 may determine the PDSCH HARQ-ACK transmission timing for the TDD PCell based on the DL association set of the TDD PCell.

In another implementation, the DL-reference UL/DL configuration of a TDD SCell may be determined by the combination of the PCell UL/DL configuration and the SCell UL/DL configuration following Table (4). The DL-reference UL/DL configuration of the TDD SCell may be used to determine the DL association set of the TDD SCell. The FDD-TDD CA module 126 may determine the PDSCH HARQ-ACK transmission timing of the TDD SCell based on the DL association set of the TDD SCell.

In yet another implementation, the DL association set of an FDD SCell may be determined by the FDD-TDD CA module 126 based on a DL-reference UL/DL configuration of the primary cell. The DL association set for the FDD SCell may be obtained by a table for an FDD cell DL association set using the DL-reference UL/DL configuration of the primary cell as an input of the table. The DL association set of the FDD cell may be a superset of a TDD DL association set (e.g., a TDD cell DL association set or a DL association set of a TDD cell) of the DL-reference UL/DL configuration of the primary cell. Furthermore, the DL association set of the FDD cell may be optimized to more evenly distribute subframes in the DL association set.

In another case, the PUCCH is transmitted on a configured PUCCH reporting cell. In this case, PUCCH reporting on a SCell may be configured. A FDD cell or a TDD cell may be configured as the PUCCH reporting cell.

In one scenario, an FDD cell may be configured as the PUCCH reporting cell. In this scenario, all cells (including FDD and TDD secondary cells (SCells)) may follow the FDD timing of the PUCCH reporting cell. The PDSCH transmission in subframe n–4 may be acknowledged in subframe n.

In another scenario, a TDD cell may be configured as the PUCCH reporting cell. In this scenario, the PDSCH HARQ-ACK information of all serving cells may be aggregated and reported on the PUCCH of the PUCCH reporting cell or a PUSCH with the lowest Cell_ID. The DL association set and PDSCH HARQ-ACK transmission timing of an aggregated cell may follow a DL-reference UL/DL configuration. In one implementation, the DL-reference UL/DL configuration of the PUCCH reporting cell is the TDD UL/DL configuration of the PUCCH reporting cell. The DL-reference UL/DL configuration of the PUCCH reporting cell may be used to determine the DL association set of the PUCCH reporting cell. The FDD-TDD CA module 126 may determine the PDSCH HARQ-ACK transmission timing based on the DL association set of the PUCCH reporting cell.

In another implementation, the DL-reference UL/DL configuration of a TDD cell other than the PUCCH reporting cell (e.g., a TDD PCell or SCell) may be determined by the combination of the PUCCH reporting cell UL/DL configuration and the TDD cell UL/DL configuration following Table (4) as describe below in connection with FIG. 5 by using the TDD PUCCH reporting cell UL/DL configuration as the PCell UL/DL configuration and the TDD cell UL/DL configuration as the SCell UL/DL configuration. The DL-reference UL/DL configuration of the TDD cell may be used for the DL association set of the TDD cell. FDD-TDD CA module 126 may determine the PDSCH HARQ-ACK transmission timing for the TDD cell based on the DL association set of the TDD cell.

In yet another implementation, the DL association set of an FDD SCell may be determined based on a DL-reference UL/DL configuration of the PUCCH reporting cell. The DL association set for the FDD SCell may be obtained from a table for an FDD cell DL association set using the DL-reference UL/DL configuration of the PUCCH reporting cell as an input of the table. The FDD DL association set may be a superset of a TDD DL association set of the DL-reference UL/DL configuration of the PUCCH reporting cell. Furthermore, the DL association set may be optimized to more evenly distribute subframes in the DL association set.

It should be noted that in all cases, if a TDD cell is configured with dynamic UL/DL reconfiguration with traffic adaptation (e.g., the TDD cell is an eIMTA cell), then the DL-reference UL/DL configuration used in CA may be based on the DL-reference UL/DL configuration of the eIMTA cell. Therefore, a DL-reference UL/DL configuration of the eIMTA cell may be used by the FDD-TDD CA module 126 to determine the PDSCH HARQ-ACK transmission timing for each serving cell for FDD and TDD carrier aggregation.

The FDD-TDD CA module 126 may send PDSCH HARQ-ACK information based on the PDSCH HARQ-ACK transmission timing. For example, the FDD-TDD CA module 126 may send PDSCH HARQ-ACK information in a transmission uplink subframe corresponding to a DL association set of the serving cell. The FDD-TDD CA module 126 may send the PDSCH HARQ-ACK information on a PUCCH or a PUSCH.

In the case where PUCCH is transmitted only on a primary cell, the FDD-TDD CA module 126 may send PDSCH HARQ-ACK information on the PUCCH of the primary cell or the PUSCH with the lowest Cell_ID. In one implementation, the FDD-TDD CA module 126 may aggregate and send the PDSCH HARQ-ACK information of each serving cell on the PUCCH of the PCell or a PUSCH with the lowest Cell_ID.

In the case where PUCCH is transmitted on a configured PUCCH reporting cell, the FDD-TDD CA module 126 may send PDSCH HARQ-ACK information on the PUCCH of the PUCCH reporting cell or the PUSCH with the lowest Cell_ID. In one implementation, the FDD-TDD CA module 126 may aggregate and send the PDSCH HARQ-ACK information of each serving cell on the PUCCH of the PUCCH reporting cell or a PUSCH with the lowest Cell_ID.

The D2D operation module 128 may determine a duplex method of each serving cell for FDD and TDD carrier aggregation. As described above, the UE 102 may be located in a wireless communication network in which carrier aggregation may be performed with one or more FDD cells and one or more TDD cells. In one implementation, the wireless communication network may be an LTE network. The D2D operation module 128 may determine whether a serving cell is an FDD cell or a TDD cell.

The D2D operation module 128 may determine whether D2D proximity service (ProSe) is configured on at least one of the serving cell. For LTE, device-to-device (D2D) proximity service (ProSe) is an important feature. Collision avoidance between a D2D and WAN uplink transmission may be configured. A priority rule may be used so that when there is an uplink transmission on the WAN side, the D2D operation module 128 may ignore a D2D transmission or reception. Alternatively, the UCI feedback in a WAN uplink may be postponed to a later subframe.

For in-network coverage cases, the D2D resource may be scheduled by the eNB 160 in a cell specific manner. Thus, a minimum D2D resource may be indicated in the physical broadcasting channel. The minimum D2D resource defines the minimum subframes the UE 102 should utilize for ProSe (e.g., ProSe discovery and communications).

The D2D operation module 128 may determine the ProSe resource allocation based on a subframe bitmap. A subframe bitmap may be configured to indicate the D2D resource allocation. The D2D bitmap may include all subframes with or without D2D resource (e.g., 1 indicates D2D, 0 indicates not D2D).

The D2D operation module 128 may determine a subframe offset 130. The subframe bitmap for D2D resource allocation may include a subframe offset 130 value (e.g., the offsetIndicatorInitialization). An eNB 160 may signal an offset 130 value as described above.

The D2D operation module 128 may determine PDSCH HARQ-ACK transmission timing for a serving cell configured with D2D service. For an FDD cell, a TDD UL/DL configuration may be configured and applied to a UL channel of the FDD cell. The PDSCH HARQ-ACK reporting of the FDD cell may be mapped to the UL subframes of the reference configuration following the FDD-TDD carrier aggregation rules assuming a TDD PCell with the configured UL/DL configuration. The subframes configured as DL or special subframes of the UL/DL configuration can be used as D2D resources.

To support a relaxed D2D resource allocation, the DL-reference UL/DL configuration applied on an FDD UL carrier may also be configured with an offset 130 value. In one approach, the PDSCH HARQ-ACK reporting of the FDD cell may be mapped to the UL subframes of the reference configuration following the FDD-TDD carrier aggregation rules assuming a TDD PCell with the configured UL/DL configuration with an offset 130 value. In another approach, the subframe bitmap for D2D resource allocation may be used to determine the HARQ-ACK reporting UL/DL configuration and offset 130 value of the FDD cell.

For a TDD cell, a similar approach may be used to apply a DL-reference UL/DL configuration on a TDD cell, so that the PDSCH HARQ-ACK reporting follows the DL-reference UL/DL configuration. The UL subframes in the DL-reference UL/DL configuration should be a subset of the UL subframes of the TDD cell UL/DL configuration. The remaining UL subframes of the TDD cell may be used as D2D resources. If there is any scheduled LTE UL transmissions (e.g. HARQ-ACK feedback, CSI report, and/or PUSCH transmission) on a subframe configured as D2D resource, the UE 102 may transmit LTE UL signal and ignore the D2D transmission or reception.

In one implementation, to ensure that a valid TDD configuration can be supported for HARQ-ACK reporting, some limitations may be applied to the subframe bitmap for D2D resource allocation. In another implementation, the subframe bitmap for D2D resource allocation can be used to determine the HARQ-ACK reporting timing of the TDD cell.

To support a relaxed D2D resource allocation, the DL-reference UL/DL configuration applied on a TDD UL carrier may also be configured with an offset 130 value. In one approach, the PDSCH HARQ-ACK reporting of the TDD cell may be mapped to the UL subframes of the reference configuration with an offset 130 value. In another approach, the subframe bitmap for D2D resource allocation can be used to determine the HARQ-ACK reporting UL/DL configuration and offset 130 value of the TDD cell.

Upon determining the PDSCH HARQ-ACK transmission timing for a serving cell configured with D2D service, the D2D operation module 128 may send PDSCH HARQ-ACK information based on the PDSCH HARQ-ACK transmission timing. For example, the D2D operation module 128 may send PDSCH HARQ-ACK information in a transmission uplink subframe corresponding to a DL association set of the serving cell. The UE 102 may send 312 the PDSCH HARQ-ACK information on a PUCCH or a PUSCH. The D2D operation module 128 may also perform D2D service on the subframes indicated by the D2D subframe bitmap.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. In some implementations, this may be based on the PDSCH HARQ-ACK transmission timing determined by the FDD-TDD CA module 126. For instance, the one or more transmitters 158 may transmit during a UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include one or more of an eNB duplex method determination module 194, an eNB PDSCH HARQ-ACK transmission timing module 196 and an eNB PDSCH HARQ-ACK information module 198.

The eNB duplex method determination module 194 may determine a duplex method of each serving cell for FDD and TDD carrier aggregation. The eNB 160 may communicate with a UE 102 over a serving cell using either FDD or TDD duplexing. The eNB duplex method determination module 194 may determine the duplex method of each of the configured serving cells used in FDD and TDD carrier aggregation. In other words, the eNB duplex method determination module 194 may determine whether a serving cell is an FDD cell or a TDD cell.

The eNB PDSCH HARQ-ACK transmission timing module 196 may determine PDSCH HARQ-ACK transmission timing for a serving cell. The timing may be based on a DL-reference UL/DL configuration. The DL-reference UL/DL configuration may be configured by the eNB 160; or derived based on the PCell and SCell configurations; or derived based on a D2D subframe bitmap configured by the eNB 160. In one case, the PUCCH is transmitted only on a primary cell (PCell). In this case, the PCell may be either an FDD cell or a TDD cell.

In one scenario, an FDD cell is the PCell. In this scenario, all cells (including FDD and TDD secondary cells (SCells)) may follow the FDD timing of the PCell. The PDSCH transmission in subframe n−4 may be acknowledged in subframe n. The PDSCH HARQ-ACK information of all cells may be aggregated and reported on the PUCCH of the PCell or a PUSCH with the lowest Cell_ID.

In another scenario, a TDD cell is the PCell. In this scenario, the PDSCH HARQ-ACK information of all serving cells may be aggregated and reported on the PUCCH of the PCell or a PUSCH with the lowest Cell_ID. The DL association set and PDSCH HARQ-ACK transmission timing of an aggregated cell may follow a DL-reference UL/DL configuration of the cell.

In one implementation, the DL-reference UL/DL configuration of the TDD PCell is the PCell UL/DL configuration. The DL-reference UL/DL configuration may be used to determine the DL association set. The eNB PDSCH HARQ-ACK transmission timing module 196 may determine the PDSCH HARQ-ACK transmission timing for the TDD PCell based on the DL association set of the TDD PCell.

In another implementation, the DL-reference UL/DL configuration of a TDD SCell may be determined by the combination of the PCell UL/DL configuration and the SCell UL/DL configuration following Table (4) as described below in connection with FIG. 5. The DL-reference UL/DL configuration of the TDD SCell may be used to determine the DL association set of the TDD SCell. The eNB PDSCH HARQ-ACK transmission timing module 196 may determine the PDSCH HARQ-ACK transmission timing of the TDD SCell based on the DL association set of the TDD SCell.

In yet another implementation, the DL association set of an FDD SCell is determined by the eNB PDSCH HARQ-ACK transmission timing module 196 based on a DL-reference UL/DL configuration of the primary cell. The DL association set for the FDD SCell may be obtained by a table for an FDD cell DL association set using the DL-reference UL/DL configuration of the primary cell as an input of the table. The DL association set of the FDD cell may be a superset of a TDD DL association set of the DL-reference UL/DL configuration of the primary cell. Furthermore, the DL association set of the FDD cell may be optimized to more evenly distribute subframes in the DL association set.

In another case, the PUCCH is transmitted on a configured PUCCH reporting cell. In this case, PUCCH reporting on a SCell may be configured. A FDD cell or a TDD cell may be configured as the PUCCH reporting cell.

In one scenario, an FDD cell may be configured as the PUCCH reporting cell. In this scenario, all cells (including FDD and TDD secondary cells (SCells)) may follow the FDD timing of the PUCCH reporting cell. The PDSCH transmission in subframe n−4 may be acknowledged in subframe n.

In another scenario, a TDD cell may be configured as the PUCCH reporting cell. In this scenario, the PDSCH HARQ-ACK information of all serving cells may be aggregated and reported on the PUCCH of the PUCCH reporting cell or a PUSCH with the lowest Cell_ID.

In one implementation, the DL-reference UL/DL configuration of the PUCCH reporting cell is the UL/DL configuration of the PUCCH reporting cell. The DL-reference UL/DL configuration of the PUCCH reporting cell may be used to determine the DL association set of the PUCCH reporting cell. The eNB PDSCH HARQ-ACK transmission timing module 196 may determine the PDSCH HARQ-ACK transmission timing based on the DL association set of the PUCCH reporting cell.

In another implementation, the DL-reference UL/DL configuration of a TDD cell other than the PUCCH reporting cell (e.g., a TDD PCell or SCell) may be determined by the combination of the PUCCH reporting cell UL/DL configuration and the TDD cell UL/DL configuration following Table (4) as describe below in connection with FIG. 5 by using the TDD PUCCH reporting cell UL/DL configuration as the PCell UL/DL configuration and the TDD cell UL/DL configuration as the SCell UL/DL configuration. The DL-reference UL/DL configuration of the TDD cell may be used to determine the DL association set of the TDD cell. The eNB PDSCH HARQ-ACK transmission timing module 196 may determine the PDSCH HARQ-ACK transmission timing for the TDD cell based on the DL association set of the TDD cell.

In yet another implementation, the DL association set of an FDD SCell may be determined based on a DL-reference UL/DL configuration of the PUCCH reporting cell. The DL association set for the FDD SCell may be obtained from a table for an FDD cell DL association set using the DL-reference UL/DL configuration of the PUCCH reporting cell as an input of the table. The DL association set may be a superset of a TDD DL association set of the DL-reference UL/DL configuration of the PUCCH reporting cell. Furthermore, the DL association set may be optimized to more evenly distribute subframes in the DL association set.

It should be noted that in all cases, if a TDD cell is configured with dynamic UL/DL reconfiguration with traffic adaptation (e.g., the TDD cell is an eIMTA cell), then the DL-reference UL/DL configuration used in CA may be based on the DL-reference UL/DL configuration of the eIMTA cell. Therefore, a DL-reference UL/DL configuration of the eIMTA cell may be used by the eNB PDSCH HARQ-ACK transmission timing module 196 to determine the PDSCH HARQ-ACK transmission timing for each serving cell for FDD and TDD carrier aggregation.

The eNB PDSCH HARQ-ACK information module 198 may receive PDSCH HARQ-ACK information based on the PDSCH HARQ-ACK transmission timing. For example, the eNB PDSCH HARQ-ACK information module 198 may receive PDSCH HARQ-ACK information in a transmission uplink subframe corresponding to a DL association set of the serving cell. The eNB PDSCH HARQ-ACK information module 198 may receive the PDSCH HARQ-ACK information on a PUCCH or a PUSCH.

In the case where PUCCH is transmitted only on a primary cell (e.g., PUCCH reporting cell is not configured), the eNB PDSCH HARQ-ACK information module 198 may receive PDSCH HARQ-ACK information on the PUCCH of the primary cell or the PUSCH with the lowest Cell_ID. In one implementation, the eNB PDSCH HARQ-ACK information module 198 may receive aggregated PDSCH HARQ-ACK information of each serving cell on the PUCCH of the PCell or a PUSCH with the lowest Cell_ID.

In the case where PUCCH is transmitted on a configured PUCCH reporting cell, the eNB PDSCH HARQ-ACK information module 198 may receive PDSCH HARQ-ACK information on the PUCCH of the PUCCH reporting cell or the PUSCH with the lowest Cell_ID. In one implementation, the eNB PDSCH HARQ-ACK information module 198 may receive aggregated PDSCH HARQ-ACK information of each serving cell on the PUCCH of the PUCCH reporting cell or a PUSCH with the lowest Cell_ID.

The eNB operations module 182 may provide information 190 to the one or more receivers 178. For example, the eNB operations module 182 may inform the receiver(s) 178 when or when not to receive PDSCH HARQ-ACK information based on the set of downlink subframe associations.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. In some implementations, this may be based on a DL association set and PDSCH HARQ-ACK transmission timing. The one or more transmitters 117 may upconvert and transmit the modulated signal(s) 115 to one or more UEs 102.

It should be noted that a DL subframe may be transmitted from the eNB 160 to one or more UEs 102 and that a UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
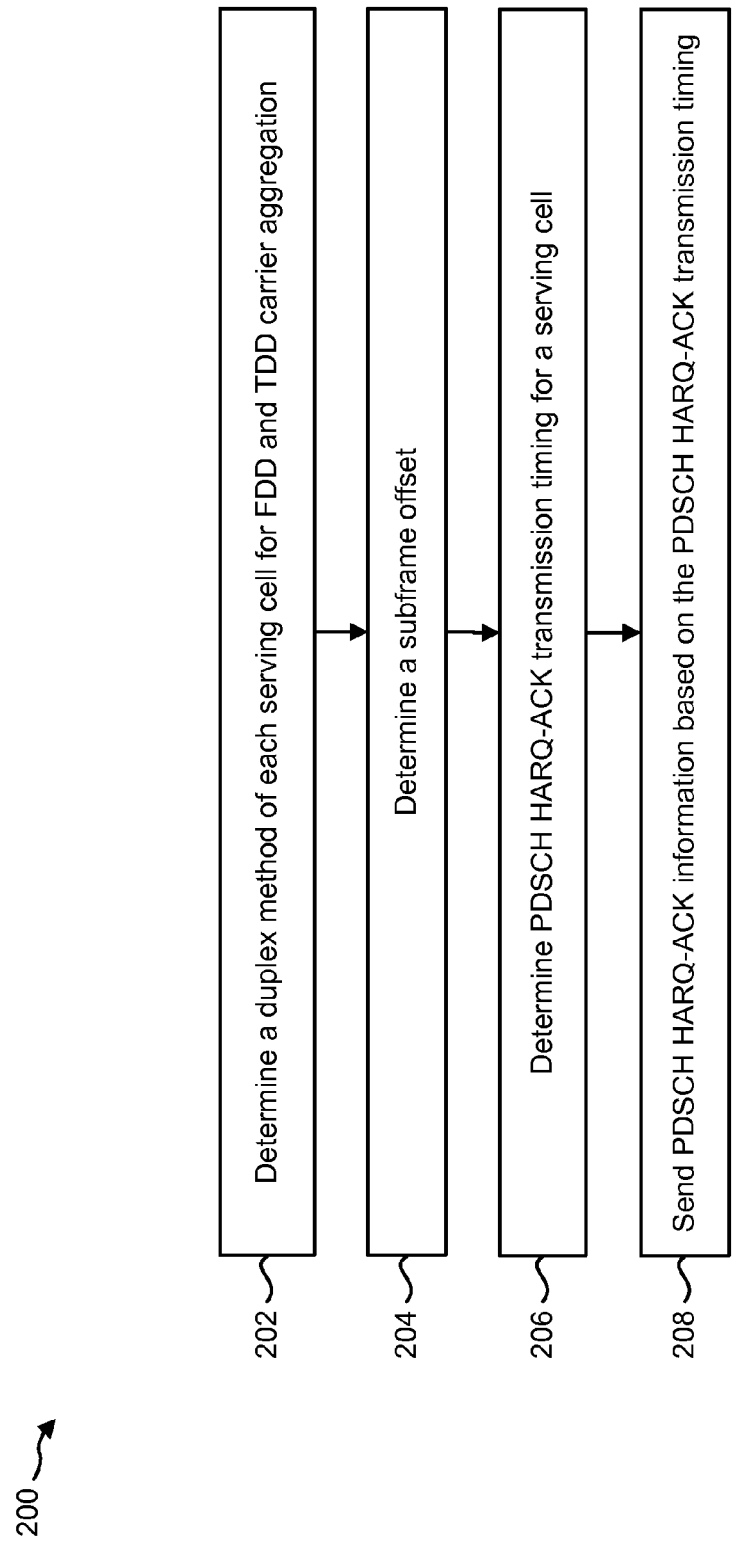
FIG. 2 is a flow diagram illustrating one implementation of a method for performing carrier aggregation (CA) by a UE.

FIG. 2 is a flow diagram illustrating one implementation of a method 200 for performing carrier aggregation by a UE 102. A UE 102 may determine 202 a duplex method of each serving cell for FDD and TDD carrier aggregation. The UE 102 may be located in a wireless communication network in which carrier aggregation may be performed with one or more FDD cells and one or more TDD cells. In one implementation, the wireless communication network may be an LTE network.

The UE 102 may communicate with an eNB 160 over a serving cell using either FDD or TDD duplexing. A serving cell may be a set of communication channels 119, 121. During carrier aggregation (CA), more than one serving cell may be aggregated to a UE 102. The UE 102 may determine 202 the duplex method of each of the configured serving cells used in FDD and TDD carrier aggregation. In other words, the UE 102 may determine 202 whether a serving cell is an FDD cell or a TDD cell. At least one serving cell may be a TDD cell and at least one serving cell may be an FDD cell.

The UE 102 may determine 204 a subframe offset 130 (or a subframe shift). An eNB 160 may signal an offset 130 value to the TDD configuration on an FDD cell to distribute the HARQ-ACK reporting from different UEs 102 into different UL subframes of a TDD PCell or reporting cell, to utilize the DL subframes of an FDD cell for different UEs 102, and to derive the DL-reference configuration of the FDD SCell based on a TDD configuration with an offset 130.

Using the subframe offset 130 may provide a solution for timing references for TDD and FDD carrier aggregation. This is especially true if a TDD configuration or a DL association pattern based on a TDD configuration that is applied on an FDD cell.

The UE 102 should support TDD UL/DL configuration on an FDD cell with an offset 130. The UE 102 may determine the DL association set and the PDSCH HARQ-ACK timing for the FDD cell based on the TDD UL/DL configuration and the offset 130 value.

If the FDD and TDD cells are not synchronized at radio frame level, the timing references may also be defined with an offset 130 value. The offset 130 value can be a number to indicate the number of transmission time intervals (TTIs) or subframes to be shifted on the SCell for subframe index synchronization. The radio frame synchronization offset 130 may be derived by the eNB 160 and the UE 102 automatically based on the synchronization signals or the radio frame synchronization offset 130 may be signaled by the eNB 160 to a UE 102. The offset 130 value for the TDD configuration and the radio frame synchronization may be signaled by the eNB 160 as one offset 130 or as two separate parameters.

The UE 102 may determine 206 PDSCH HARQ-ACK transmission timing for a serving cell. The PDSCH HARQ-ACK reporting for FDD and TDD networks are very different. With FDD, the HARQ-ACK for a PDSCH transmission in subframe n may be reported in subframe n+4 on a PUCCH or PUSCH transmission. However, with TDD, the PDSCH HARQ-ACK may only be reported on subframes with a UL allocation. Therefore, with TDD, a UL subframe may be associated with more than one DL subframe for PDSCH HARQ-ACK reporting. Accordingly, multi-cell HARQ-ACK reporting for CA in hybrid duplexing networks may be specified.

For a TDD cell, the downlink association set and PDSCH HARQ-ACK reporting timing are well defined for all TDD UL/DL configurations. A TDD cell may follow a DL-reference UL/DL configuration of the cell for the downlink association set and the PDSCH HARQ-ACK timing. The downlink association set may be determined based on the DL-reference UL/DL configuration. The downlink association set then defines the PDSCH HARQ-ACK timing.

However, for an FDD cell, a DL may exist in every subframe, but there are no existing TDD UL/DL configurations that can report all subframes as DL. Therefore, a new downlink association set may be defined for an FDD cell. The FDD downlink association set may be defined for all seven TDD UL/DL configurations. Therefore, when FDD and TDD CA is used, and a TDD cell is the PCell or the PUCCH reporting cell for PDSCH HARQ-ACK feedback, the one or more FDD serving cells may use the FDD DL association set determined according to the DL-reference UL/DL configuration of the PCell and/or the PUCCH reporting TDD cell.

A downlink association set for an FDD cell may be used for non-carrier aggregation operation. For example, normal (e.g., non-carrier aggregation) FDD PDSCH HARQ-ACK transmission timing (e.g., a PDSCH transmission in subframe n−4 and a HARQ-ACK transmission in subframe n) may be replaced by the downlink association set for an FDD cell. Therefore, whether the UE 102 uses the downlink association set for an FDD cell or a fixed 4 milliseconds (ms) PDSCH HARQ-ACK timing may be configured by a higher layer. This approach may provide for a subframe that is free of PUCCH resources.

In one case, the PUCCH is transmitted only on a primary cell. In this case, the primary cell may be either an FDD cell or a TDD cell. If an FDD cell is the primary cell (PCell), all cells (including FDD and TDD secondary cells (SCells)) may follow the FDD timing of the PCell. In this scenario (where an FDD cell is the PCell) a TDD cell may be viewed as a half-duplex FDD cell (e.g., with a fixed 4 ms delay). The PDSCH transmission in subframe n–4 may be acknowledged in subframe n. The PDSCH HARQ-ACK information of all cells may be aggregated and reported on the PUCCH of the PCell or a PUSCH with the lowest Cell_ID. Therefore, if the serving cell is an FDD cell and the serving cell is a primary cell or if the serving cell is a secondary cell and a primary cell is an FDD cell, the UE 102 may determine 206 a PDSCH HARQ-ACK transmission timing for the serving cell upon detection of a PDSCH transmission in an earlier subframe (e.g., n–4) intended for the UE 102. The PDSCH HARQ-ACK information may be sent in a later subframe (e.g., n).

In another scenario, a TDD cell is the PCell. In this scenario, the PDSCH HARQ-ACK information of all serving cells may be aggregated and reported on the PUCCH of the PCell or a PUSCH with the lowest Cell_ID. The DL association set and PDSCH HARQ-ACK transmission timing of an aggregated cell may follow a DL-reference UL/DL configuration of the cell.

In one implementation, the DL-reference UL/DL configuration of the TDD PCell is the PCell UL/DL configuration. The DL-reference UL/DL configuration of the TDD PCell may be used to determine the DL association set of the TDD PCell. The UE 102 may determine 206 the PDSCH HARQ-ACK transmission timing of the TDD PCell based on the DL association set of the TDD PCell.

In another implementation, the DL-reference UL/DL configuration of a TDD SCell may be determined by the combination of the PCell UL/DL configuration and the SCell UL/DL configuration following Table (4) as described below in connection with FIG. 5. The DL-reference UL/DL configuration of the TDD SCell may be used to determine the DL association set of the TDD SCell. The UE 102 may determine 206 the PDSCH HARQ-ACK transmission timing of the TDD SCell based on the DL association set of the TDD SCell. Therefore, when the primary cell is a TDD cell, the serving cell is a TDD cell and the serving cell is a secondary cell, the DL association set for the serving cell is determined based on a DL-reference UL/DL configuration of the serving cell. The DL-reference UL/DL configuration of the serving cell is determined based on a TDD UL/DL configuration of the primary cell and a TDD UL/DL configuration of the serving cell.

In yet another implementation, the DL association set of an FDD SCell is determined based on a DL-reference UL/DL configuration of the primary cell and the TDD configuration of the FDD SCell. A subframe offset 130 or a subframe shift may be configured for the TDD configuration of the FDD SCell. The DL association set of the FDD SCell may be obtained by a DL-reference UL/DL configuration for the FDD SCell. The DL-reference UL/DL configuration of the FDD SCell (with or without offset 130) may be configured directly by the eNB 160. The DL association set of the FDD SCell may be determined by the overlapping UL subframes between the DL-reference UL/DL configuration of the PCell and the TDD UL/DL configuration of the FDD SCell (with or without offset 130).

In another case, the PUCCH is transmitted on a configured PUCCH reporting cell. In this case, PUCCH reporting on a SCell may be configured. An FDD cell or a TDD cell may be configured as the PUCCH reporting cell. In a small cell scenario, a UE 102 may receive a stronger DL signal from a macro cell eNB 160, but the uplink to the small cell may be much better than the link to macro cell eNB 160. The macro cell eNB 160 may configure the small cell as the uplink PUCCH reporting cell. For example, if the PCell is an FDD cell and a small cell is a TDD cell, but the uplink to the small cell is much better than the uplink to the PCell, the TDD SCell may be configured to carry PUCCH for PDSCH HARQ-ACK reporting. The PUCCH reporting cell may also be referred to as a reference cell or reporting cell.

If an FDD cell is configured as the PUCCH reporting cell, all cells (including FDD and TDD primary and secondary cells) may follow the FDD timing of the PUCCH reporting cell. In this scenario (where an FDD cell is the PUCCH reporting cell) a TDD cell may be viewed as a half-duplex FDD cell (e.g., with a fixed 4 ms delay). The PDSCH transmission in subframe n–4 may be acknowledged in subframe n. The PDSCH HARQ-ACK information of all cells may be aggregated and reported on the PUCCH of the PUCCH reporting cell or a PUSCH with the lowest Cell_ID. Therefore, if the serving cell is an FDD cell and the serving cell is a PUCCH reporting cell or if the serving cell is a secondary cell and a PUCCH reporting cell is an FDD cell, the UE 102 may determine 206 a PDSCH HARQ-ACK transmission timing for the serving cell upon detection of a PDSCH transmission in an earlier subframe (e.g., n–4) intended for the UE 102. The PDSCH HARQ-ACK information may be sent in a later subframe (e.g., n).

In another scenario, a TDD cell may be configured as the PUCCH reporting cell. In this scenario, the PDSCH HARQ-ACK information of all serving cells may be aggregated and reported on the PUCCH of the PUCCH reporting cell or a PUSCH with the lowest Cell_ID. The DL association set and PDSCH HARQ-ACK transmission timing of an aggregated cell may follow a DL-reference UL/DL configuration of the cell.

In one implementation, the DL-reference UL/DL configuration of the TDD PUCCH reporting cell is the PUCCH reporting cell UL/DL configuration. The DL-reference UL/DL configuration may be used to determine the DL association set of the PUCCH reporting cell. The UE 102 may determine 206 the PDSCH HARQ-ACK transmission timing of the PUCCH reporting cell based on the DL association set of the PUCCH reporting cell.

In another implementation, the DL-reference UL/DL configuration of a TDD cell other than the PUCCH reporting cell (e.g., a TDD PCell or SCell) may be determined by the combination of the PUCCH reporting cell UL/DL configuration and the TDD cell UL/DL configuration following Table (4) as describe below in connection with FIG. 5. For example, the TDD PUCCH reporting cell UL/DL configuration corresponds to the PCell UL/DL configuration of Table (4) and the TDD cell UL/DL configuration corresponds to the SCell UL/DL configuration or Table (4). The DL-reference UL/DL configuration of the TDD cell may be used for the DL association set of the TDD cell.

The UE 102 may determine 206 the PDSCH HARQ-ACK transmission timing for the TDD cell based on the DL association set of the TDD cell. Therefore, when the PUCCH reporting cell is a TDD cell, the serving cell is a TDD cell and the serving cell is a secondary cell, the DL association set for the serving cell is determined based on a DL-reference UL/DL configuration of the serving cell. The DL-reference UL/DL configuration of the serving cell is determined based on a TDD UL/DL configuration of the PUCCH reporting cell and a TDD UL/DL configuration of the serving cell.

In yet another configuration, the DL association set of an FDD SCell is determined based on a DL-reference UL/DL configuration of the PUCCH reporting cell and the TDD configuration of the FDD SCell. A subframe offset 130 or a subframe shift may be configured for the TDD configuration of the FDD SCell. The DL association set of the FDD SCell may be obtained by a DL-reference UL/DL configuration for the FDD SCell. The DL-reference UL/DL configuration of the FDD SCell (with or without offset 130) may be configured directly by the eNB 160. The DL association set of the FDD SCell may be determined by the overlapping UL subframes between the DL-reference UL/DL configuration of the reporting cell and the TDD UL/DL configuration of the FDD SCell (with or without offset 130).

It should be noted that in all cases, if a TDD cell is configured with dynamic UL/DL reconfiguration with traffic adaptation (e.g., the TDD cell is an eIMTA cell), then the DL-reference UL/DL configuration used in CA may be based on the DL-reference UL/DL configuration of the eIMTA cell. Therefore, in one case, if an eIMTA TDD cell is configured as the PCell, a DL-reference UL/DL configuration of the eIMTA cell may be used to determine 206 the PDSCH HARQ-ACK transmission timing for each serving cell for FDD and TDD carrier aggregation. In another case, if an eIMTA TDD cell is configured as the PUCCH reporting cell, a DL-reference UL/DL configuration of the eIMTA cell may be used to determine 206 the PDSCH HARQ-ACK transmission timing for each serving cell for FDD and TDD carrier aggregation.

The UE 102 may send 208 PDSCH HARQ-ACK information based on the PDSCH HARQ-ACK transmission timing. For example, the UE 102 may send 208 PDSCH HARQ-ACK information in a transmission uplink subframe corresponding to a DL association set of the serving cell. The UE 102 may send 208 the PDSCH HARQ-ACK information on a PUCCH or a PUSCH.

In the case where PUCCH is transmitted only on a primary cell, the UE 102 may send 208 PDSCH HARQ-ACK information on the PUCCH of the primary cell or the PUSCH with the lowest Cell_ID. In one implementation, the UE 102 may aggregate and send 208 the PDSCH HARQ-ACK of all cells on the PUCCH of the PCell or a PUSCH with the lowest Cell_ID.

In the case where PUCCH is transmitted on a configured PUCCH reporting cell, the UE 102 may send 208 PDSCH HARQ-ACK information on the PUCCH of the PUCCH reporting cell or the PUSCH with the lowest Cell_ID. In one implementation, the UE 102 may aggregate and send 208 the PDSCH HARQ-ACK of all cells on the PUCCH of the PUCCH reporting cell or a PUSCH with the lowest Cell_ID.

Figure 3:
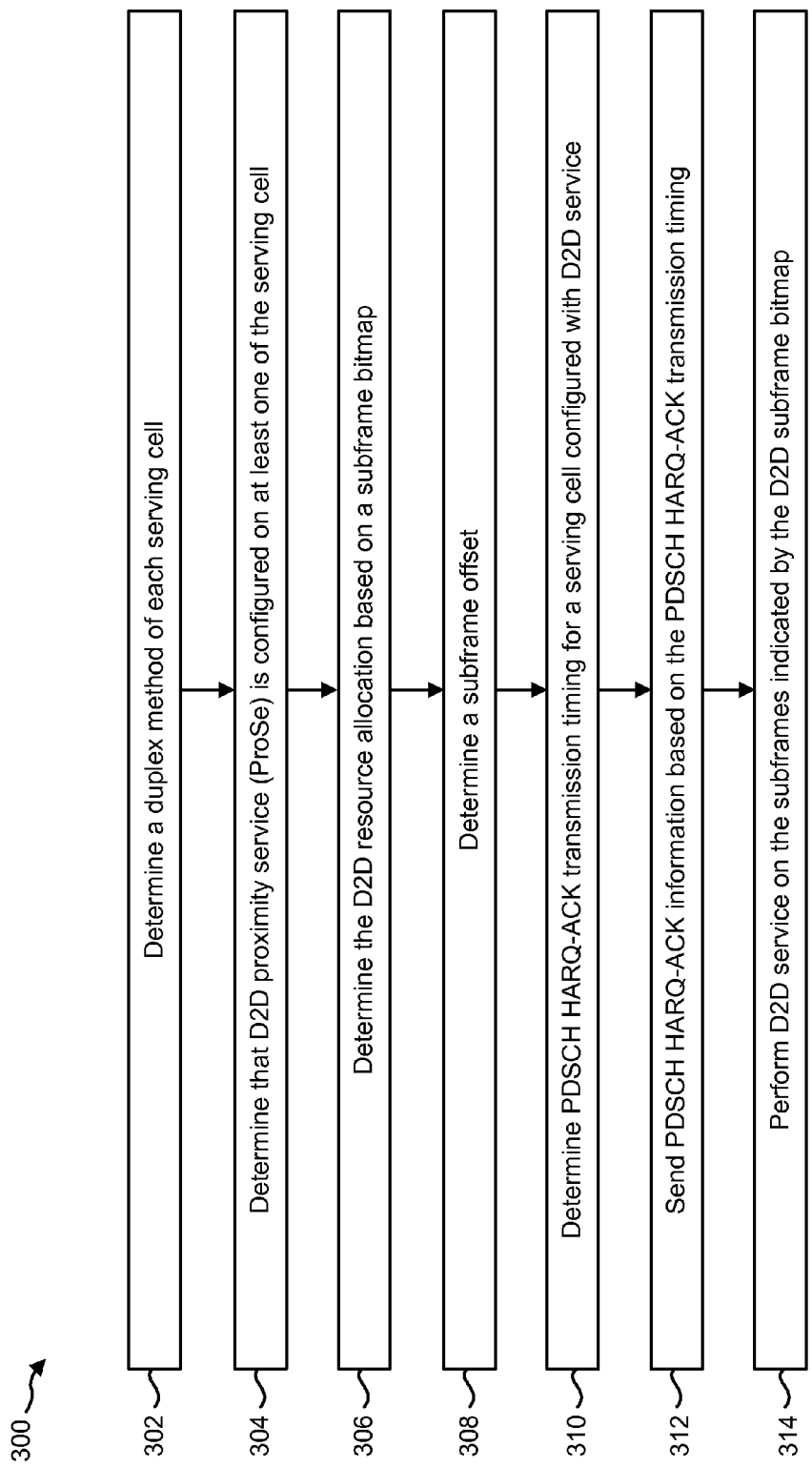
FIG. 3 is a flow diagram illustrating one implementation of a method for performing LTE device-to-device (D2D) proximity service (ProSe) by a UE.

FIG. 3 is a flow diagram illustrating one implementation of a method 300 for performing LTE device-to-device (D2D) proximity service (ProSe) by a UE 102. A UE 102 may determine 302 a duplex method of each serving cell. The UE 102 may be located in a wireless communication network with one or more FDD cells and one or more TDD cells. In one implementation, the wireless communication network may be an LTE network.

The UE 102 may determine 304 whether D2D proximity service (ProSe) is configured on at least one of the serving cells. For LTE, device-to-device (D2D) proximity service (ProSe) may provide direct discovery and communication between UEs 102. Collision avoidance between a D2D and WAN uplink transmission may be configured. A priority rule may be used so that when there is an uplink transmission on the WAN side, the UE 102 may ignore a D2D transmission or reception. Alternatively, the UCI feedback in a WAN uplink may be postponed to a later subframe.

For in-network coverage cases, the D2D resource may be scheduled by the eNB 160 in a cell specific manner. Thus, a minimum D2D resource may be indicated in the physical broadcasting channel. The minimum D2D resource defines the minimum subframes the UE 102 should utilize for ProSe (e.g., D2D discovery and communications).

The UE 102 may determine 306 the D2D resource allocation based on a subframe bitmap. The D2D resource allocation and indication methods may include the transmission and reception resource pool for SA, Discovery, and Mode 2 data of the UE 102. The D2D resource allocation may be indicated using a subframe bitmap.

A subframe bitmap may be configured to indicate the D2D resource allocation. For FDD, the subframe bitmap (e.g., subframeBitmap) may refer to a contiguous set of uplink subframes. And for FDD, the subframe bitmap length may be 40 subframes.

For TDD UL/DL configurations 1-5, a subframe bitmap length may be twice the number of uplink sub-frames within a radio frame. For TDD UL/DL configuration 6, the subframe bitmap length may be 30, which is six times the number of uplink sub-frames within a radio frame. For TDD UL/DL configuration 0, the subframe bitmap length may be 42, which is seven times the number of uplink sub-frames within a radio frame.

The UE 102 may determine 308 a subframe offset 130. The subframe bitmap for D2D resource allocation may include a subframe offset 130 value (e.g., the offsetIndicatorInitialization). The offset 130 value may indicate the start of a resource pool within the subframe set. An eNB 160 may signal an offset 130 value to the TDD configuration on an FDD cell to distribute the HARQ-ACK reporting from different UEs 102 into different UL subframes of a TDD PCell or reporting cell, to utilize the DL subframes of an FDD cell for different UEs 102, and to derive the DL-reference configuration of the FDD SCell based on a TDD configuration with an offset 130.

The UE 102 may determine 310 PDSCH HARQ-ACK transmission timing for a serving cell configured with D2D service. For an FDD cell, a TDD UL/DL configuration may be configured and applied to a UL channel of the FDD cell. The PDSCH HARQ-ACK reporting of the FDD cell may be mapped to the UL subframes of the reference configuration following the FDD-TDD carrier aggregation rules assuming a TDD PCell with the configured UL/DL configuration. The subframes configured as DL or special subframes of the UL/DL configuration can be used as D2D resources. In one implementation, to ensure that a valid TDD configuration can be supported for HARQ-ACK reporting, some limitations may be applied to the subframe bitmap for D2D resource allocation. In another implementation, the subframe bitmap for D2D resource allocation can be used to determine the HARQ-ACK reporting timing of the FDD cell.

For an FDD cell, to provide more flexibility of D2D resource allocation, and to consider potential unsynchronized adjacent networks and possible different offset 130 values in the subframe bitmap, the limitations of the subframe bitmap may be further relaxed. To support the relaxed D2D resource allocation, the DL-reference UL/DL configuration applied on an FDD UL carrier may also be configured with an offset 130 value.

In one approach, the PDSCH HARQ-ACK reporting of the FDD cell may be mapped to the UL subframes of the reference configuration following the FDD-TDD carrier aggregation rules assuming a TDD PCell with the configured UL/DL configuration with an offset 130 value. In another approach, the subframe bitmap for D2D resource allocation can be used to determine the HARQ-ACK reporting UL/DL configuration and offset 130 value of the FDD cell.

For a TDD cell, a similar approach may be used to apply a DL-reference UL/DL configuration on a TDD cell, so that the PDSCH HARQ-ACK reporting follows the DL-reference UL/DL configuration. The UL subframes in the DL-reference UL/DL configuration should be a subset of the UL subframes of the TDD cell UL/DL configuration. The remaining UL subframes of the TDD cell may be used as D2D resources. If there is any scheduled LTE UL transmissions (e.g. HARQ-ACK feedback, CSI report, and/or PUSCH transmission) on a subframe configured as D2D resource, the UE 102 may transmit LTE UL signal and ignore the D2D transmission or reception.

In one implementation, to ensure that a valid TDD configuration can be supported for HARQ-ACK reporting, some limitations may be applied to the subframe bitmap for D2D resource allocation. In another implementation, the subframe bitmap for D2D resource allocation can be used to determine the HARQ-ACK reporting timing of the TDD cell.

For a TDD cell, to provide more flexibility of D2D resource allocation, and to consider potential unsynchronized adjacent networks and possible different offset 130 values in the subframe bitmap, the limitations of the subframe bitmap may be further relaxed. To support the relaxed D2D resource allocation, the DL-reference UL/DL configuration applied on a TDD UL carrier may also be configured with an offset 130 value.

In one approach, the PDSCH HARQ-ACK reporting of the TDD cell may be mapped to the UL subframes of the reference configuration with an offset 130 value. In another approach, the subframe bitmap for D2D resource allocation can be used to determine the HARQ-ACK reporting UL/DL configuration and offset 130 value of the TDD cell.

Upon determining the PDSCH HARQ-ACK transmission timing for a serving cell configured with D2D service, the UE 102 may send 312 PDSCH HARQ-ACK information based on the PDSCH HARQ-ACK transmission timing. For example, the UE 102 may send 312 PDSCH HARQ-ACK information in a transmission uplink subframe corresponding to a DL association set of the serving cell. The UE 102 may send 312 the PDSCH HARQ-ACK information on a PUCCH or a PUSCH. The UE 102 may also perform 314 D2D service on the subframes indicated by the D2D subframe bitmap.

Figure 4:
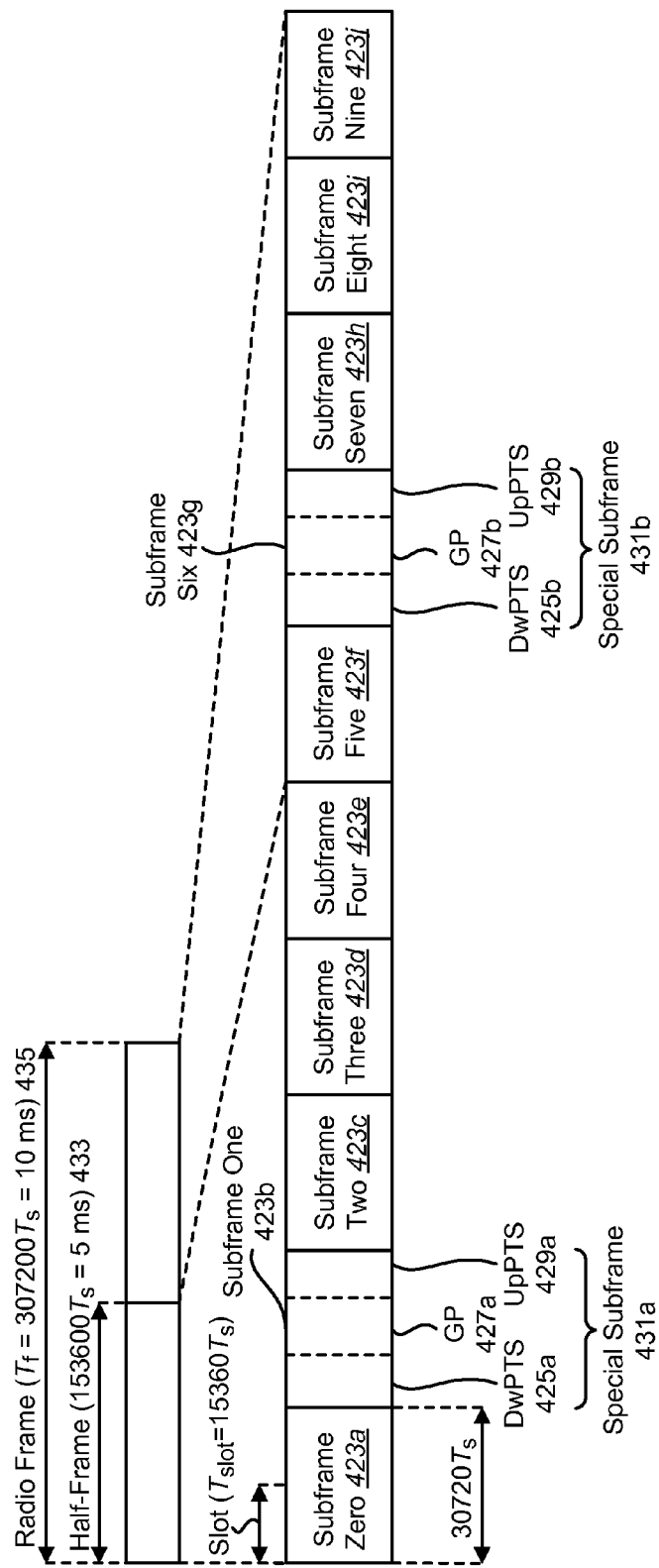
FIG. 4 is a diagram illustrating one example of a radio frame that may be used in accordance with the systems and methods disclosed herein.

FIG. 4 is a diagram illustrating one example of a radio frame 435 that may be used in accordance with the systems and methods disclosed herein. This radio frame 435 structure illustrates a TDD structure. Each radio frame 435 may have a length of $T_f=307200 \cdot T_s=10$ ms, where $T_f$ is a radio frame 435 duration and $T_s$ is a time unit equal to $$\frac{1}{(15000 \times 2048)}$$

seconds. The radio frame 435 may include two half-frames 433, each having a length of $153600 \cdot T_s=5$ ms. Each half-frame 433 may include five subframes 423a-e, 423f-j each having a length of $30720 \cdot T_s=1$ ms.

TDD UL/DL configurations 0-6 are given below in Table (1) (from Table 4.2-2 in 3GPP TS 36.211). UL/DL configurations with both 5 millisecond (ms) and 10 ms downlink-to-uplink switch-point periodicity may be supported. In particular, seven UL/DL configurations are specified in 3GPP specifications, as shown in Table (1) below. In Table (1), "D" denotes a downlink subframe, "S" denotes a special subframe and "U" denotes a UL subframe.

TABLE (1)

| TDD UL/DL Configuration Number | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table (1) above, for each subframe in a radio frame, "D" indicates that the subframe is reserved for downlink transmissions, "U" indicates that the subframe is reserved for uplink transmissions and "S" indicates a special subframe with three fields: a downlink pilot time slot (DwPTS), a guard period (GP) and an uplink pilot time slot (UpPTS). The length of DwPTS and UpPTS is given in Table (2) (from Table 4.2-1 of 3GPP TS 36.211) subject to the total length of DwPTS, GP and UpPTS being equal to $30720 \cdot T_s=1$ ms. In Table (2), "cyclic prefix" is abbreviated as "CP" and "configuration" is abbreviated as "Config" for convenience.

TABLE (2)

| | Normal CP in downlink | | | Extended CP in downlink | | |
|---|---|---|---|---|---|---|
| | | UpPTS | | | UpPTS | |
| Special Subframe Config | DwPTS | Normal CP in uplink | Extended CP in uplink | DwPTS | Normal CP in uplink | Extended CP in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

UL/DL configurations with both 5 ms and 10 ms downlink-to-uplink switch-point periodicity are supported. In the case of 5 ms downlink-to-uplink switch-point periodicity, the special subframe exists in both half-frames. In the case of 10 ms downlink-to-uplink switch-point periodicity, the special subframe exists in the first half-frame only. Subframes 0 and 5 and DwPTS may be reserved for downlink transmission. UpPTS and the subframe immediately following the special subframe may be reserved for uplink transmission.

In accordance with the systems and methods disclosed herein, some types of subframes 423 that may be used include a downlink subframe, an uplink subframe and a special subframe 431. In the example illustrated in FIG. 4, which has a 5 ms periodicity, two standard special subframes 431a-b are included in the radio frame 435.

The first special subframe 431a includes a downlink pilot time slot (DwPTS) 425a, a guard period (GP) 427a and an uplink pilot time slot (UpPTS) 429a. In this example, the first standard special subframe 431a is included in subframe one 423b. The second standard special subframe 431b includes a downlink pilot time slot (DwPTS) 425b, a guard period (GP) 427b and an uplink pilot time slot (UpPTS) 429b. In this example, the second standard special subframe 431b is included in subframe six 423g. The length of the DwPTS 425a-b and UpPTS 429a-b may be given by Table 4.2-1 of 3GPP TS 36.211 (illustrated in Table (2) above) subject to the total length of each set of DwPTS 425, GP 427 and UpPTS 429 being equal to 30720· $T_s$=1 ms.

Each subframe i 423a-j (where i denotes a subframe ranging from subframe zero 423a (e.g., 0) to subframe nine 423j (e.g., 9) in this example) is defined as two slots, 2i and 2i+1 of length $T_{slot}$=15360·$T_s$=0.5 ms in each subframe 423. For example, subframe zero (e.g., 0) 423a may include two slots, including a first slot.

UL/DL configurations with both 5 ms and 10 ms downlink-to-uplink switch-point periodicity may be used in accordance with the systems and methods disclosed herein. FIG. 4 illustrates one example of a radio frame 435 with 5 ms switch-point periodicity. In the case of 5 ms downlink-to-uplink switch-point periodicity, each half-frame 433 includes a standard special subframe 431a-b. In the case of 10 ms downlink-to-uplink switch-point periodicity, a special subframe 431 may exist in the first half-frame 433 only.

Subframe zero (e.g., 0) 423a and subframe five (e.g., 5) 423f and DwPTS 425a-b may be reserved for downlink transmission. The UpPTS 429a-b and the subframe(s) immediately following the special subframe(s) 431a-b (e.g., subframe two 423c and subframe seven 423h) may be reserved for uplink transmission. It should be noted that, in some implementations, special subframes 431 may be considered DL subframes in order to determine a set of DL subframe associations that indicate UCI transmission uplink subframes of a UCI transmission cell.

Figure 5:
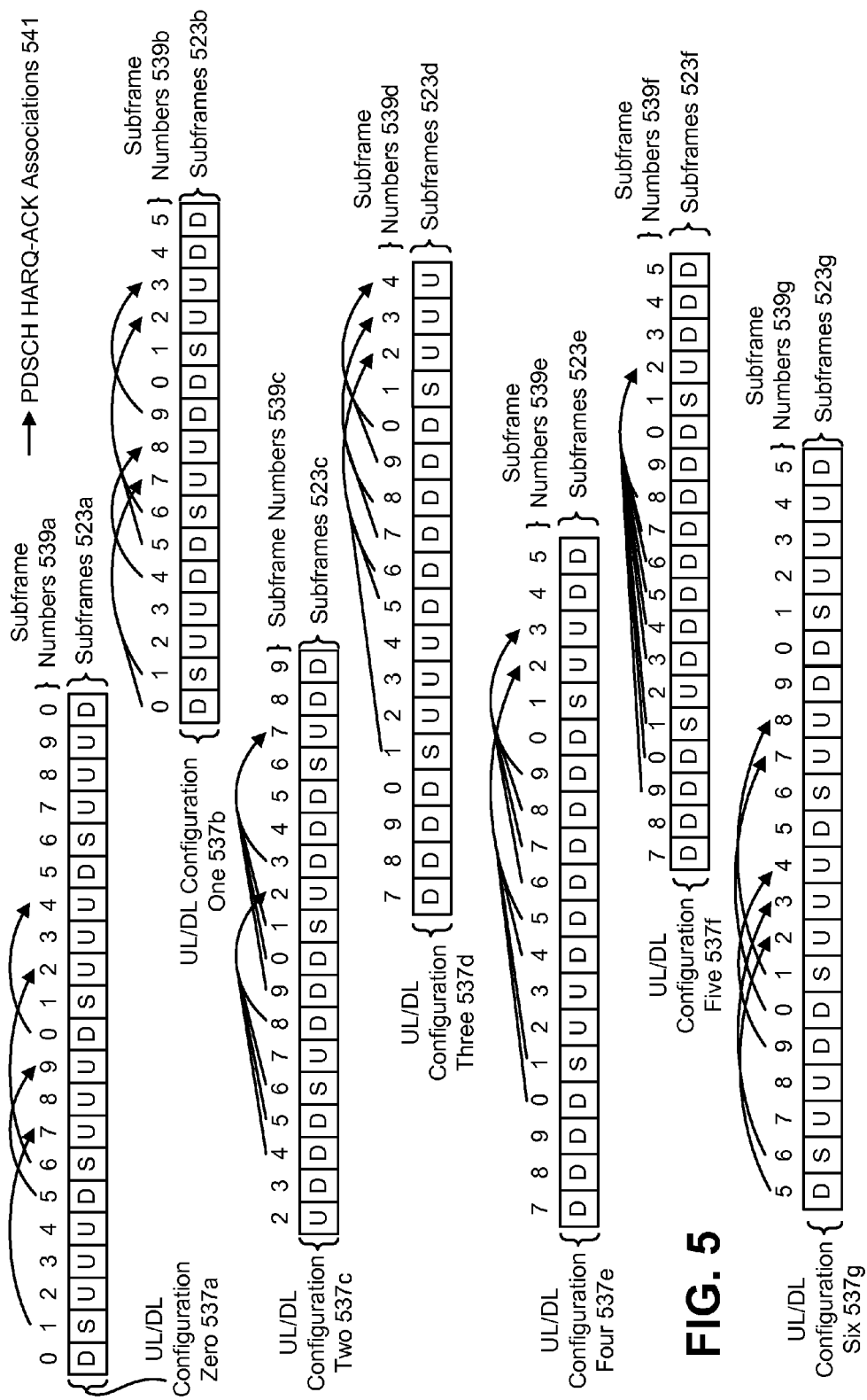
FIG. 5 is a diagram illustrating some Time-Division Duplexing (TDD) uplink-downlink (UL/DL) configurations in accordance with the systems and methods described herein.

FIG. 5 is a diagram illustrating some TDD UL/DL configurations 537a-g in accordance with the systems and methods described herein. There are seven different TDD UL/DL configurations, all with different association timings. In particular, FIG. 5 illustrates UL/DL configuration zero 537a (e.g., "UL/DL configuration 0") with subframes 523a and subframe numbers 539a, UL/DL configuration one 537b (e.g., "UL/DL configuration 1") with subframes 523b and subframe numbers 539b, UL/DL configuration two 537c (e.g., "UL/DL configuration 2") with subframes 523c and subframe numbers 539c and UL/DL configuration three 537d (e.g., "UL/DL configuration 3") with subframes 523d and subframe numbers 539d. FIG. 5 also illustrates UL/DL configuration four 537e (e.g., "UL/DL configuration 4") with subframes 523e and subframe numbers 539e, UL/DL configuration five 537f (e.g., "UL/DL configuration 5") with subframes 523f and subframe numbers 539f and UL/DL configuration six 537g (e.g., "UL/DL configuration 6") with subframes 523g and subframe numbers 539g.

FIG. 5 further illustrates PDSCH HARQ-ACK associations 541 (e.g., PDSCH HARQ-ACK feedback on PUCCH or PUSCH associations). The PDSCH HARQ-ACK associations 541 may indicate HARQ-ACK reporting subframes corresponding to subframes for PDSCH transmissions (e.g., subframes in which PDSCH transmissions may be sent and/or received). It should be noted that some of the radio frames illustrated in FIG. 5 have been truncated for convenience.

The systems and methods disclosed herein may be applied to one or more of the UL/DL configurations 537a-g illustrated in FIG. 5. For example, one or more PDSCH HARQ-ACK associations 541 corresponding to one of the UL/DL configurations 537a-g illustrated in FIG. 5 may be applied to communications between a UE 102 and eNB 160. For example, a UL/DL configuration 537 may be determined (e.g., assigned to, applied to) a PCell. In this case, PDSCH HARQ-ACK associations 541 may specify PDSCH HARQ-ACK timing (e.g., a HARQ-ACK reporting subframe) for HARQ-ACK feedback transmissions corresponding to the PCell. For SCell HARQ-ACK feedback transmissions, the PDSCH HARQ-ACK associations 541 corresponding to a DL-reference UL/DL configuration in accordance with the feedback parameters may be utilized.

A PDSCH HARQ-ACK association 541 may specify a particular (PDSCH HARQ-ACK) timing for receiving HARQ-ACK information corresponding to a PDSCH. A PDSCH HARQ-ACK association 541 may specify a reporting subframe in which the UE 102 reports (e.g., transmits) the HARQ-ACK information corresponding to the PDSCH to the eNB 160. The reporting subframe may be determined based on the subframe that includes the PDSCH sent by the eNB 160.

The downlink association set and PDSCH HARQ-ACK transmission timing for all TDD UL/DL configurations are illustrated in FIG. 5. Table (3) (from Table 10.1.3.1-1 of 3GPP TS 36.213) provides TDD DL association sets. In particular, Table (3) provides DL association set index K: $\{k_0, k_1, \ldots k_{M-1}\}$ for TDD.

TABLE (3)

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |

TABLE (3)-continued

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

With inter-band TDD CA with different UL/DL configurations, the association timing of one TDD SCell may follow the timing of a DL-reference UL/DL configuration. The DL-reference UL/DL configuration may be the same as or different from the TDD UL/DL configuration of the given SCell.

The PDSCH scheduling may be performed by corresponding PDCCH formats. For Release-11 and beyond UE, the enhanced PDCCH (ePDCCH) may also be used to schedule PDSCH. The PDSCH HARQ-ACK information of CA cells may be reported on a PUCCH or a PUSCH of one serving cell only. In one implementation, the PUCCH reporting may only be carried on the PCell. For PUSCH reporting, the PDSCH HARQ-ACK information may be reported on the PUSCH of a cell with the lowest Cell_ID.

According to a known solution (e.g., Release-11), a UE 102 may be configured with more than one TDD serving cell. If at least two serving cells have different TDD UL/DL configurations and if a serving cell is a primary cell, then the primary cell UL/DL configuration is the DL-reference UL/DL configuration for the serving cell.

According to the known solution, at least two serving cells may have different TDD UL/DL configurations and a serving cell may be a secondary cell. If the pair formed by primary cell UL/DL configuration, serving cell UL/DL configuration belongs to Set 1 in Table (4) (from Table 10.2-1 of 3GPP TS 36.213), then the DL-reference UL/DL configuration for the serving cell is defined in the corresponding Set in Table (4). If the UE 102 is not configured to monitor a physical downlink control channel (PDCCH) or enhanced physical downlink control channel (EPDCCH) in another serving cell for scheduling the serving cell, and if the pair formed by primary cell UL/DL configuration, serving cell UL/DL configuration belongs to Set 2 or Set 3 in Table (4), then the DL-reference UL/DL configuration for the serving cell is defined in the corresponding Set in Table (4). If the UE 102 is configured to monitor PDCCH/EPDCCH in another serving cell for scheduling the serving cell, and if the pair formed by primary cell UL/DL configuration, serving cell UL/DL configuration belongs to Set 4 or Set 5 in Table (4), then the DL-reference UL/DL configuration for the serving cell is defined in the corresponding Set in Table (4).

TABLE (4)

| Set # | (Primary cell UL/DL configuration, Secondary cell UL/DL configuration) | DL-reference UL/DL configuration |
|---|---|---|
| Set 1 | (0, 0) | 0 |
| | (1, 0), (1, 1), (1, 6) | 1 |
| | (2, 0), (2, 2), (2, 1), (2, 6) | 2 |
| | (3, 0), (3, 3), (3, 6) | 3 |
| | (4, 0), (4, 1), (4, 3), (4, 4), (4, 6) | 4 |
| | (5, 0), (5, 1), (5, 2), (5, 3), (5, 4), (5, 5), (5, 6) | 5 |
| | (6, 0), (6, 6) | 6 |

TABLE (4)-continued

| Set # | (Primary cell UL/DL configuration, Secondary cell UL/DL configuration) | DL-reference UL/DL configuration |
|---|---|---|
| Set 2 | (0, 1), (6, 1) | 1 |
| | (0, 2), (1, 2), (6, 2) | 2 |
| | (0, 3), (6, 3) | 3 |
| | (0, 4), (1, 4), (3, 4), (6, 4) | 4 |
| | (0, 5), (1, 5), (2, 5), (3, 5), (4, 5), (6, 5) | 5 |
| | (0, 6) | 6 |
| Set 3 | (3, 1), (1, 3) | 4 |
| | (3, 2), (4, 2), (2, 3), (2, 4) | 5 |
| Set 4 | (0, 1), (0, 2), (0, 3), (0, 4), (0, 5), (0, 6) | 0 |
| | (1, 2), (1, 4), (1, 5) | 1 |
| | (2, 5) | 2 |
| | (3, 4), (3, 5) | 3 |
| | (4, 5) | 4 |
| | (6, 1), (6, 2), (6, 3), (6, 4), (6, 5) | 6 |
| Set 5 | (1, 3) | 1 |
| | (2, 3), (2, 4) | 2 |
| | (3, 1), (3, 2) | 3 |
| | (4, 2) | 4 |

According to the known solution, if a UE 102 is configured with more than one serving cell and if at least two serving cells have different UL/DL configurations and if the DL-reference UL/DL configuration for at least one serving cell is TDD UL/DL Configuration 5, then the UE 102 may not be expected to be configured with more than two serving cells. If a UE 102 is configured with one serving cell, or the UE 102 is configured with more than one serving cell and the UL/DL configurations of all serving cells is the same, then the UE 102 may, upon detection of a PDSCH transmission within subframe(s) n−k, where k∈K and K is defined in Table (3) intended for the UE 102 and for which a HARQ-ACK response may be provided, transmit the PDSCH HARQ-ACK response in a UL subframe n.

Furthermore, according to the known solution, if a UE 102 is configured with more than one serving cell and if at least two serving cells have different UL/DL configurations, then the UE 102 may, upon detection of a PDSCH transmission within subframe(s) n−k for serving cell c, where k∈$K_C$ intended for the UE 102 and for which a HARQ-ACK response shall be provided, transmit the PDSCH HARQ-ACK response in UL subframe n. The set $K_C$ may contain values of k∈K such that subframe n−k corresponds to a DL subframe or a special subframe for serving cell c. K defined in Table (3) (where "UL/DL configuration" in Table (3) refers to the "DL-reference UL/DL configuration") may be associated with subframe n.

In one implementation, HARQ-ACK repetition may be enabled. Upon detection of a PDSCH transmission within subframe(s) n−k, where k∈K and K is defined in Table (3) intended for the UE 102 and for which a HARQ-ACK response may be provided, and if the UE 102 is not repeating the transmission of any HARQ-ACK in subframe n corresponding to a PDSCH transmission in a DL subframe earlier than subframe n−k, then the UE 102 may transmit only the HARQ-ACK response (corresponding to the detected PDSCH transmission in subframe n–k) on a PUCCH in the UL subframe n and the next $N_{ANRep}-1$ UL subframes denoted as $n_1, \ldots, n_{N_{ANRep}-1}$. The UE 102 may not transmit any other signal in UL subframe n, $n_1, \ldots, n_{N_{ANRep}-1}$. Furthermore, the UE 102 may not transmit any HARQ-ACK response repetitions corresponding to any detected PDSCH transmission in subframes $n_i$–k, where k∈$K_i$, $K_i$ is the set defined in Table (3) corresponding to UL subframe $n_i$, and $1 \leq i \leq N_{ANRep}-1$.

For TDD HARQ-ACK bundling, if the UE 102 detects that at least one downlink assignment has been missed, the UE 102 may not transmit HARQ-ACK information on PUCCH if HARQ-ACK is the only uplink control information (UCI) present in a given subframe. The uplink timing for the ACK corresponding to a detected PDCCH/EPDCCH indicating downlink semi-persistent scheduling (SPS) release may be the same as the uplink timing for the HARQ-ACK corresponding to a detected PDSCH.

Figure 6:
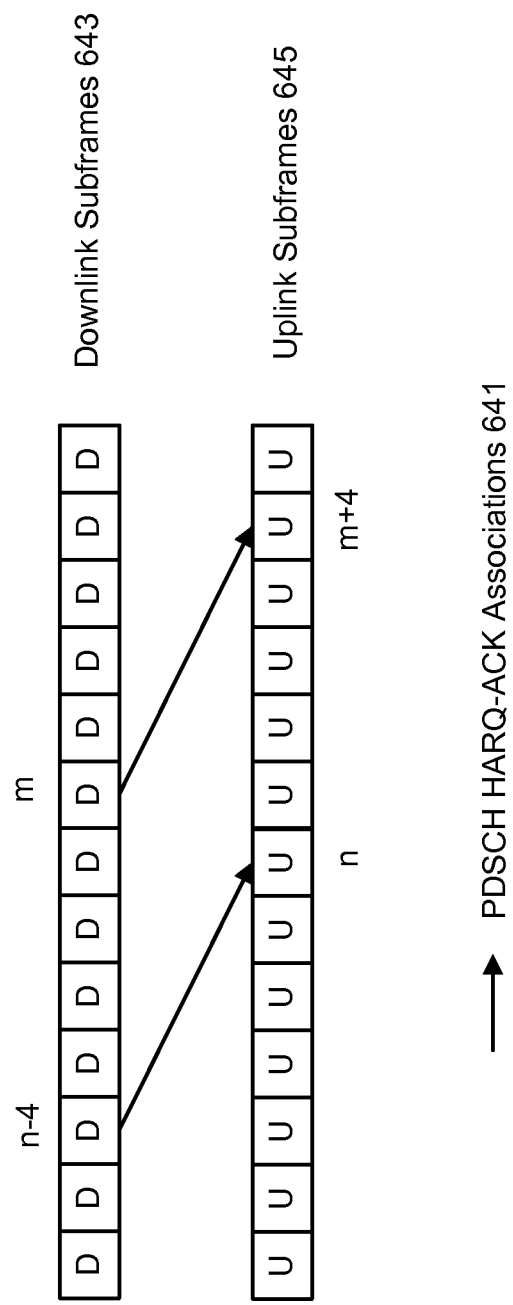
FIG. 6 illustrates the association timings of an Frequency-Division Duplexing (FDD) cell.

FIG. 6 illustrates the association timings of an FDD cell. The FDD cell may include paired downlink subframes 643 and uplink subframes 645. The PDSCH HARQ-ACK associations 641 for an FDD cell are illustrated. The PDSCH HARQ-ACK associations 641 may indicate HARQ-ACK reporting subframes corresponding to subframes for PDSCH transmissions (e.g., subframes in which PDSCH transmissions may be sent and/or received). In some implementations, the PDSCH HARQ-ACK reporting may occur on a PUCCH or a PUSCH.

A fixed 4 ms interval may be applied to the PDSCH HARQ-ACK associations 641. In one implementation, each of the downlink subframes 643 and uplink subframes 645 may be 1 ms. Therefore, the PDSCH HARQ-ACK transmission in subframe m+4 may be associated with a PDSCH transmission in subframe m. Similarly, a PDSCH transmission in subframe n–4 may be associated with the PDSCH HARQ-ACK transmission in subframe n.

According to a known solution (e.g., Release-11), for FDD, the UE 102 may, upon detection of a PDSCH transmission in subframe n–4 intended for the UE 102 and for which an HARQ-ACK may be provided, transmit the HARQ-ACK response in subframe n. If HARQ-ACK repetition is enabled, upon detection of a PDSCH transmission in subframe n–4 intended for the UE 102 and for which a HARQ-ACK response may be provided, and if the UE 102 is not repeating the transmission of any HARQ-ACK in subframe n corresponding to a PDSCH transmission in subframes n–$N_{ANRep}$–3, ..., n–5, the UE 102 may transmit only the HARQ-ACK response (corresponding to the detected PDSCH transmission in subframe n–4) on PUCCH in subframes n, n+1, ..., n+$N_{ANRep}$–1. The UE 102 may not transmit any other signal in subframes n, n+1, ..., n+$N_{ANRep}$–1. Furthermore, the UE 102 may not transmit any HARQ-ACK response repetitions corresponding to any detected PDSCH transmission in subframes n–3, ..., n+$N_{ANRep}$–5.

Figure 7:
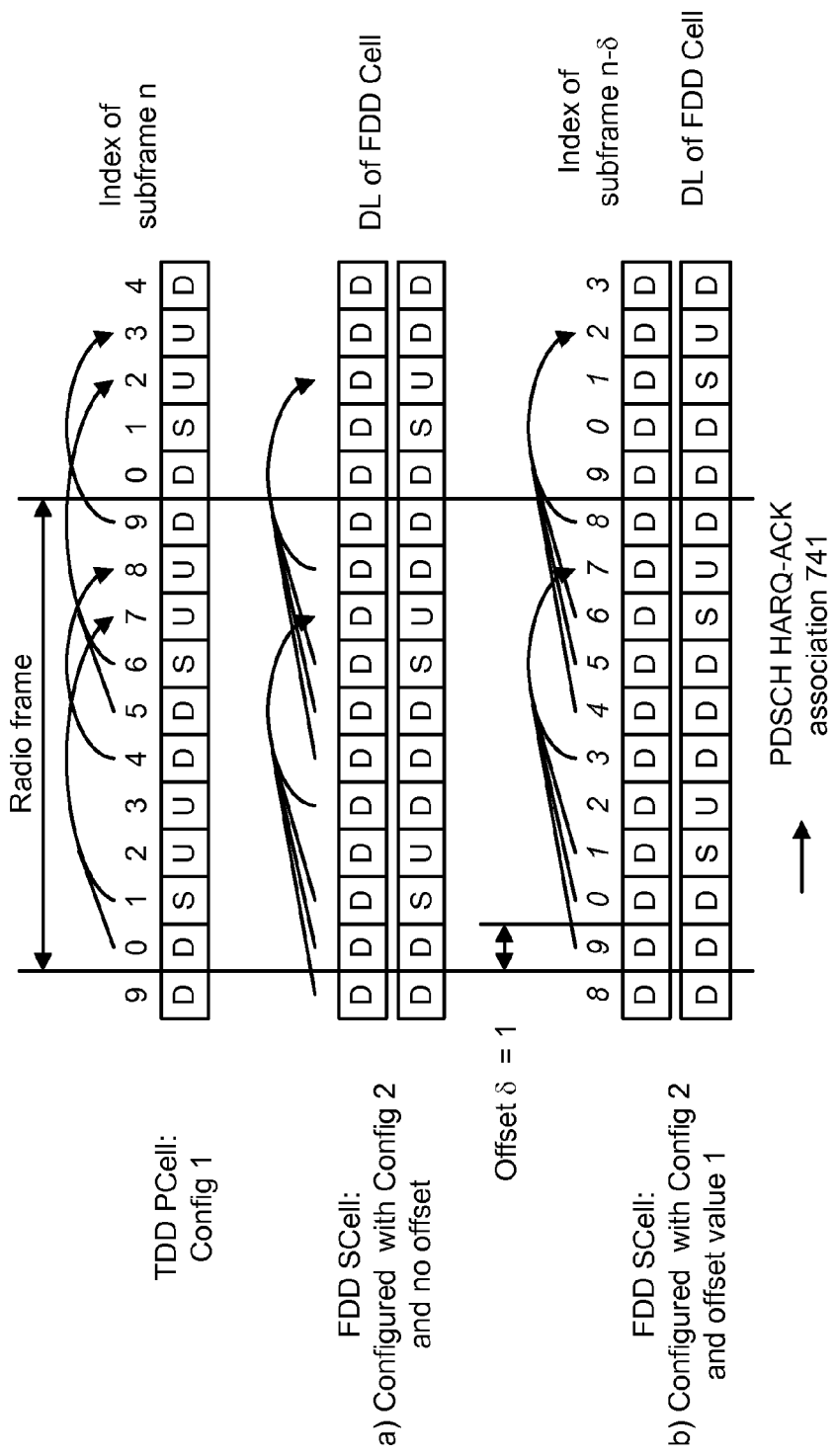
FIG. 7 illustrates examples of TDD configurations on an FDD cell with and without offset values.

FIG. 7 illustrates examples of TDD configurations on an FDD cell with and without offset 130 values. An important issue for TDD-FDD CA is the PDSCH HARQ-ACK reporting. The PDSCH HARQ-ACK reporting may follow PDSCH HARQ-ACK associations 741, as indicated in FIG. 7. CA scenarios assume an ideal backhaul. Thus, the feedback information can be aggregated and transmitted on the PUCCH of one reporting cell (e.g., PCell). Furthermore, an SCell with a smaller path loss may be configured as the UL reporting cell. Thus, the PUCCH may be reported on the reporting cell. The reporting cell may be configured by higher layer signaling (e.g., RRC).

If an FDD cell is a PCell or the reporting cell, since an FDD cell has UL in every subframe, FDD HARQ-ACK timing may be applied directly on a TDD cell. In this way, the PDSCH transmission in subframe n in a TDD cell is reported on a UL subframe in subframe n+4 (e.g., on the PUCCH of the FDD PCell or the reporting cell). Alternatively, a TDD cell may maintain its own HARQ-ACK timing and the PDSCH HARQ-ACK bits may be aggregated together with other cells and reported on a UL subframe (e.g., on the PUCCH of the FDD PCell or the reporting cell).

If a TDD cell is a PCell or the reporting cell, TDD configurations may be applied on an FDD cell. Other methods for PDSCH HARQ-ACK reporting on a TDD cell assume that the radio frames are synchronized in the TDD and FDD cells. In these methods, on an FDD cell, reuse of the TDD configuration DL association set and the HARQ-ACK timing is simple. However, since all TDD configurations are synchronized at the radio frame level, some of the DL subframes on an FDD cell may not be used for PDSCH transmission to any of the TDD-FDD CA UEs 102 in a cell, which may cause unnecessary loss of DL resources. Furthermore, some of the UL subframes on the PCell or reporting cell may be overloaded with HARQ-ACK bits from multiple cells or multiple UEs 102, while the other UL subframes have limited HARQ-ACK reports.

Therefore, it may be desirable to distribute the HARQ-ACK reports more evenly in the UL subframes of a TDD PCell or reporting cell. Furthermore, if different DL subframes can be restricted for PDSCH transmission to different UEs 102, the eNB 160 can have more flexibility on scheduling, thereby achieving better DL resource utilization.

A TDD UL/DL configuration may include an offset 130 value (or subframe shift value) that is configured to an FDD cell. The offset 130 value δ may be applied for a DL association set and HARQ-ACK timing. For an FDD cell configured with a TDD UL/DL configuration, the downlink association set and the HARQ-ACK for subframe n is determined based on Table (3) above while the subframe index may be determined by replacing subframe n with subframe (n–δ), as shown in Table (5).

TABLE (5)

| UL/DL Configuration | Subframe n-δ | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |

TABLE (5)-continued

| UL/DL Configuration | Subframe n–δ | | | | | | | | | |
|---|---|---|---|---|---|---|---|---|---|---|
| | 0 | 1 | 2 | 3 | 4 | 5 | 6 | 7 | 8 | 9 |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

The subframe number n may be cell dependent. In a synchronized network, the radio frame may be synchronized among all cells in CA. In a given subframe $n_c$, the subframe index of $n_c$ of cell c is the same as other cells. The subframe index may range from 0 to 9 because a radio frame always has 10 subframes.

In FIG. 7, a TDD PCell using UL/DL configuration 1 is illustrated and an FDD SCell using UL/DL configuration 2 is illustrated. When no offset 130 value is configured, the FDD SCell follows the DL association set and HARQ-ACK timing based on UL/DL configuration 2. Thus, the HARQ-ACK bits of the FDD SCell are reported in subframes 2 and 7 based on the TDD PCell subframe index. When an offset 130 value of δ=1 is configured and applied, the FDD SCell still follows the DL association set and HARQ-ACK timing based on UL/DL configuration 2. However, with the offset 130, the association in subframe n is determined by (n–δ). Thus, the HARQ-ACK bits of the FDD SCell are reported in subframes 3 and 8 based on the TDD PCell subframe index instead.

The use of offset 130 values may provide several benefits. For example, in a TDD-FDD CA case with multiple FDD SCells, applying different offset 130 values can distribute the HARQ-ACK bits for different FDD cells into different UL subframes, which reduces the payload size of a PUCCH or PUSCH HARQ-ACK reporting. As another example, in a TDD-FDD CA case with multiple UEs 102 in the serving cells, the eNB 160 can apply different offset 130 values for different UEs 102. Thus, the FDD cells of different UEs 102 can be reported in different UL subframes, which may help balance the PUCCH resources among UEs 102.

Figure 8:
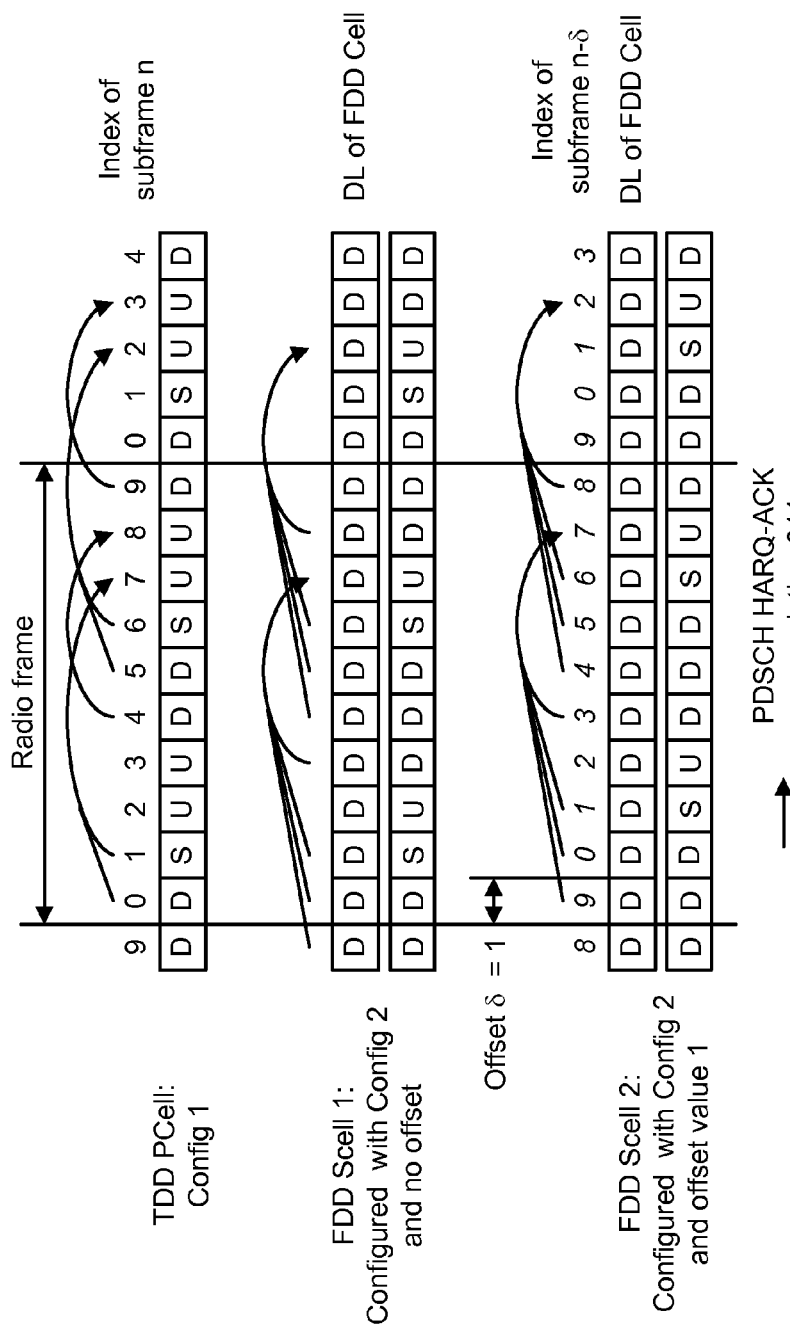
FIG. 8 illustrates an example of offset usage in TDD-FDD CA with multiple FDD secondary cells (SCells)

FIG. 8 illustrates an example of offset 130 usage in TDD-FDD CA with multiple FDD SCells. In FIG. 8, a TDD PCell using UL/DL configuration 1 and two FDD SCells using UL/DL configuration 2 are illustrated. In this configuration, no offset 130 value is configured on SCell 1 and an offset 130 of δ=1 is configured and applied on SCell 2. Thus, the HARQ-ACK bits of SCell 1 are reported in subframes 2 and 7 and the HARQ-ACK bits of SCell 2 are reported in subframes 3 and 8 based on the TDD PCell subframe index, as indicated by the PDSCH HARQ-ACK associations 841. In the example illustrated in FIG. 8, the HARQ-ACK payload may be balanced across different UL subframes.

Figure 9:
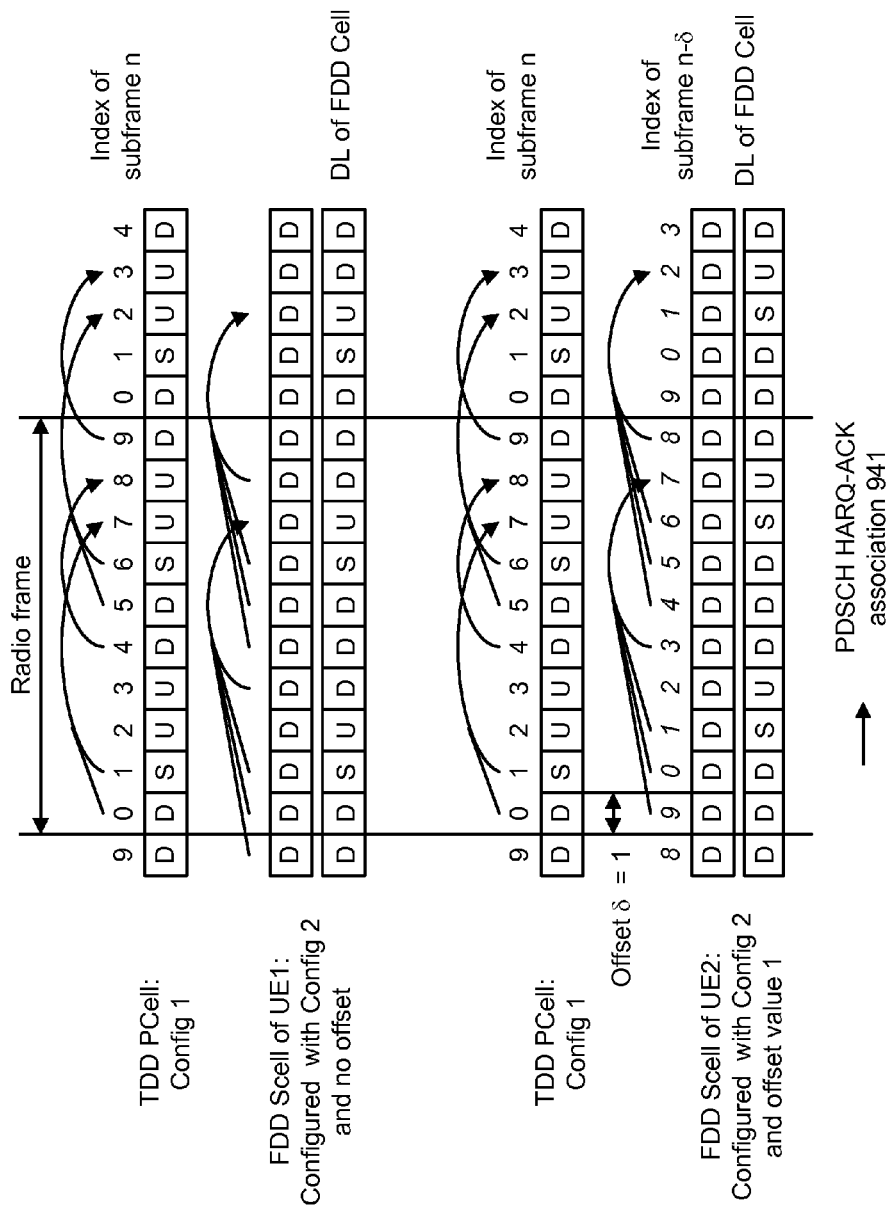
FIG. 9 illustrates an example of different offset values for TDD-FDD CA UEs.

FIG. 9 illustrates an example of different offset 130 values for TDD-FDD CA UEs 102. In FIG. 9, a TDD PCell using UL/DL configuration 1 and two UEs 102 with FDD SCells using UL/DL configuration 2 are illustrated. In this configuration, no offset 130 value is configured for UE1 and an offset 130 of δ=1 is configured and applied for UE2.

The PDSCH HARQ-ACK reporting may follow PDSCH HARQ-ACK associations 941, as indicated in FIG. 9. Thus, the HARQ-ACK bits of the FDD SCell of UE1 are reported in subframes 2 and 7 and the HARQ-ACK bits of UE2 are reported in subframes 3 and 8 based on the TDD PCell subframe index. Using different offset 130 values can help balance the HARQ-ACK payloads in different UL subframes on the TDD PCell.

By applying TDD UL/DL configuration timing on an FDD cell, there may be some subframes without a DL association for HARQ-ACK reporting. These DL subframes in the FDD cell cannot be used by the UE 102 for PDSCH transmissions that require HARQ-ACK feedback. For example, in FIG. 9, DL subframes 2 and 7 cannot be utilized for PDSCH transmission for UE1. By applying the offset 130, the restricted DL subframes may be shifted for UE2. Thus, subframes 3 and 8 (with indexes of subframe n–δ equal to 2 and 7) cannot be scheduled for PDSCH transmissions for UE2. Therefore, the eNB 160 can schedule PDSCH transmissions for different UEs 102 in the restricted subframes for a given UE 102. Thus, the DL resources are not wasted.

If the offset 130 is configured and enabled, the offset 130 range should be defined. An offset 130 of 0 is the same as no offset 130. Since a radio frame has 10 subframes, the offset 130 value can range from 0 to 9 (inclusively) in one configuration. In another configuration, the offset 130 value can range from –4 to 5 (inclusively).

If an offset 130 value is configured for a TDD UL/DL configuration on an FDD cell, a UE 102 should determine the DL association set and HARQ-ACK reporting of the FDD cell based on the DL-reference UL/DL configuration of the FDD cell with the given offset 130 value. The DL-reference UL/DL configuration of the FDD SCell can be determined using several methods. For example, the DL-reference UL/DL configuration of the FDD SCell can be configured directly and may be applied as the TDD UL/DL configuration of the FDD cell. In this case, the configured UL/DL configuration on an FDD cell should be selected so that the UL subframes of the UL/DL configuration with offset 130 are a subset of the UL subframes of the TDD/DL configuration of the TDD PCell or reporting cell.

As another example, the DL-reference UL/DL configuration may be derived based on the overlapping UL subframes of the TDD PCell or reporting cell UL/DL configuration and the configured UL/DL configuration with offset 130 on the FDD cell. In this case, the configured UL/DL configuration of an FDD cell should be selected so that the UL subframes of the UL/DL configuration with offset 130 should have one or more overlapping UL subframes with the TDD UL/DL configuration of the TDD PCell or reporting cell. If there is no overlapping UL subframe, the offset 130 value is invalid and should be ignored.

Figure 10:
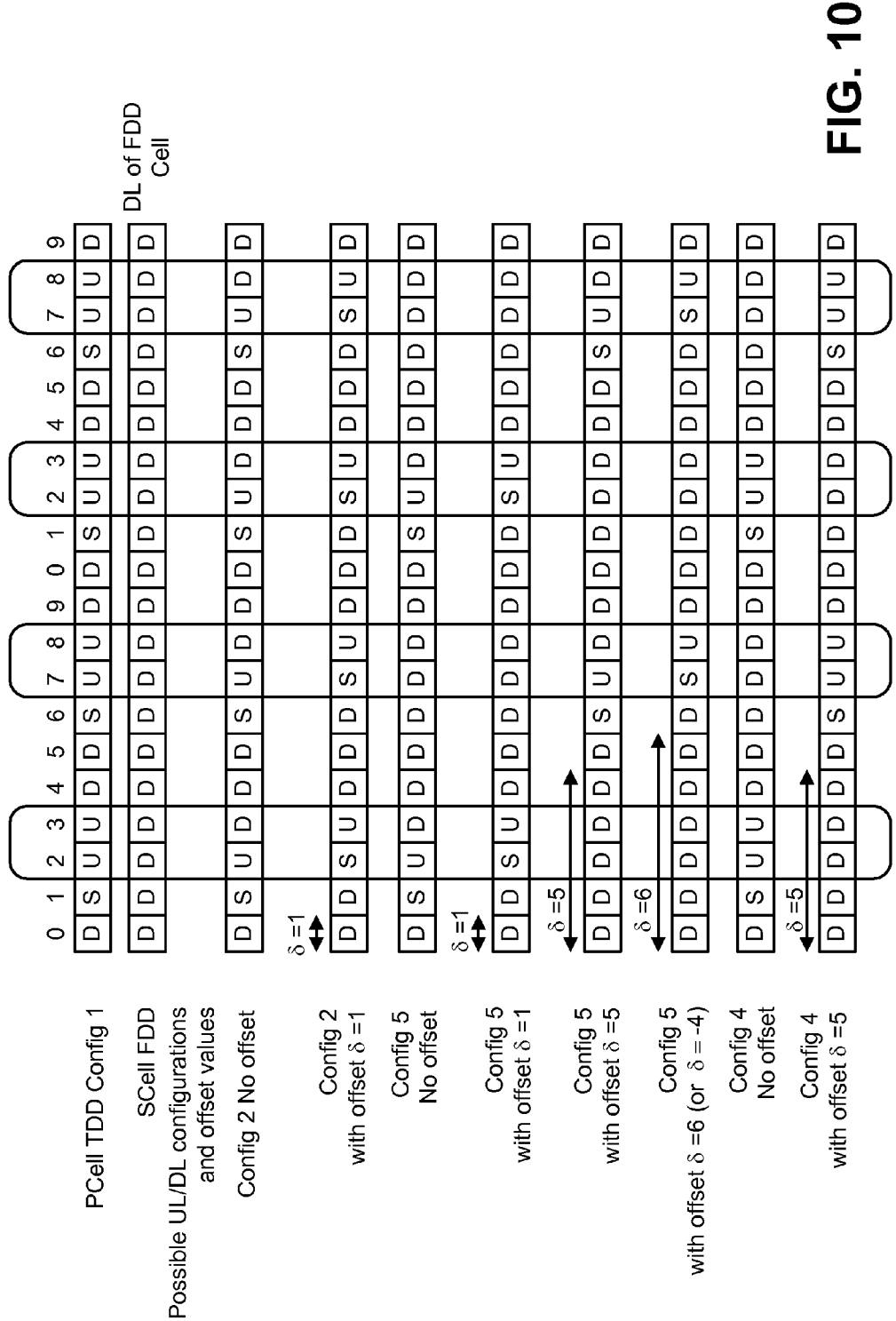
FIG. 10 illustrates an example of possible UL/DL configurations and offset values for an FDD SCell if a TDD PCell is configured with UL/DL configuration 1.

FIG. 10 illustrates an example of possible UL/DL configurations and offset 130 values for an FDD SCell if a TDD PCell is configured with UL/DL configuration 1. The use of an offset 130 provides greater flexibility for the DL subframe allocation and HARQ-ACK reporting for the FDD cells in TDD-FDD CA.

Figure 11:
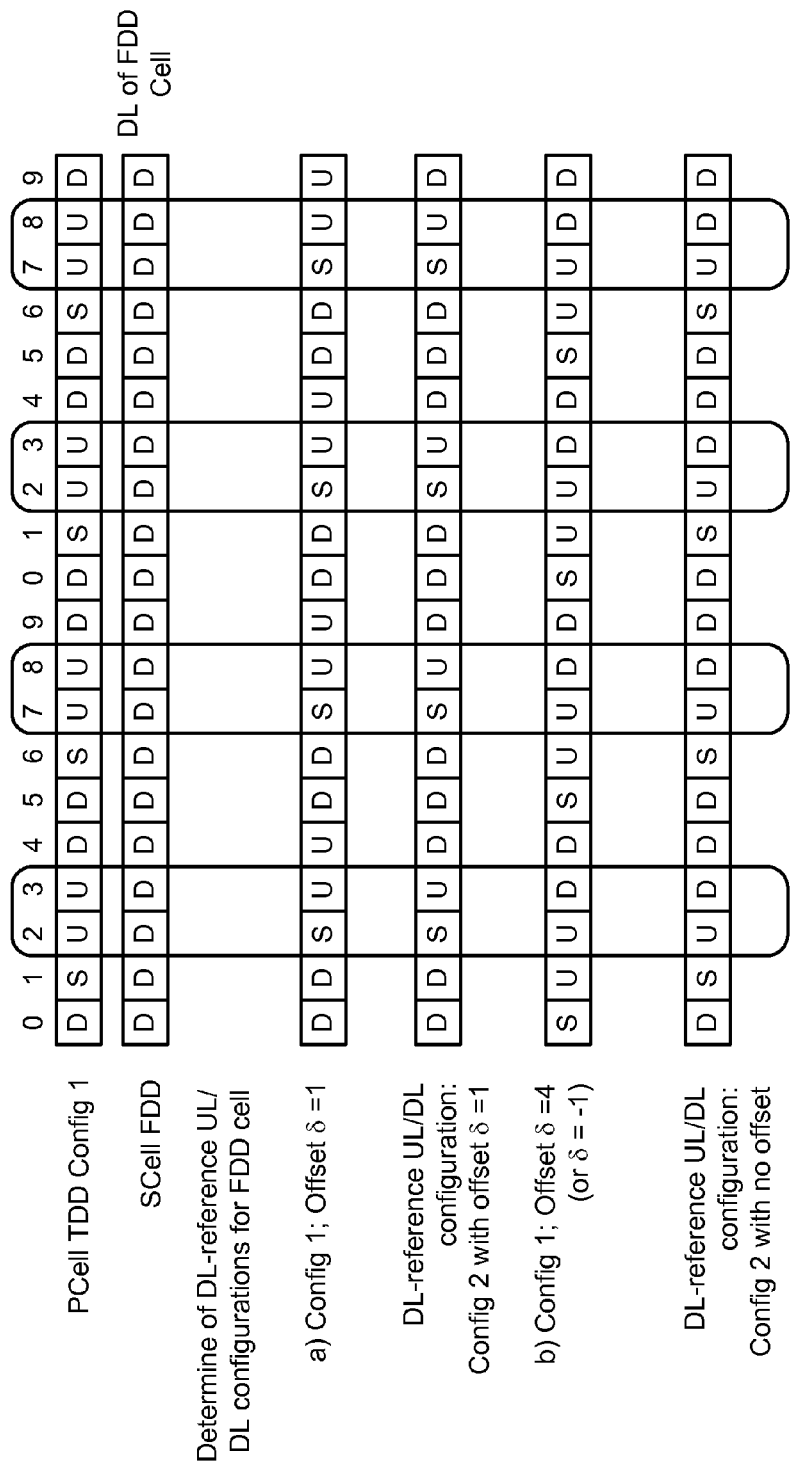
FIG. 11 illustrates examples of FDD cell DL-reference configurations with TDD UL/DL configurations and offsets.

FIG. 11 illustrates examples of FDD cell DL-reference configurations with TDD UL/DL configurations and offsets 130. The DL-reference UL/DL configuration and timing offset 130 may be determined by the overlapping UL subframes between the UL/DL configuration of the TDD PCell or reporting cell and the UL/DL configuration with offset 130. FIG. 11 shows an example of determining the DL-reference UL/DL configurations of an FDD SCell. In this example, TDD UL/DL configuration 1 is used on a TDD PCell and the same configuration is applied on an FDD SCell with different offset 130 values.

In a first example a, the offset δ is 1 and the overlapping UL forms a TDD UL/DL configuration 2 with offset 130 value of 1. Thus, the DL-reference UL/DL configuration of the FDD SCell is UL/DL configuration with offset δ=1. In a second example b, the offset δ is 4 (if the offset 130 range is from 0 to 9) or −1 (if the offset 130 range is from −4 to 5). The overlapping UL forms a TDD UL/DL configuration 2 with no offset 130 (i.e., δ=0). Thus, the DL-reference UL/DL configuration of the FDD SCell is UL/DL configuration with no offset 130.

Figure 12:
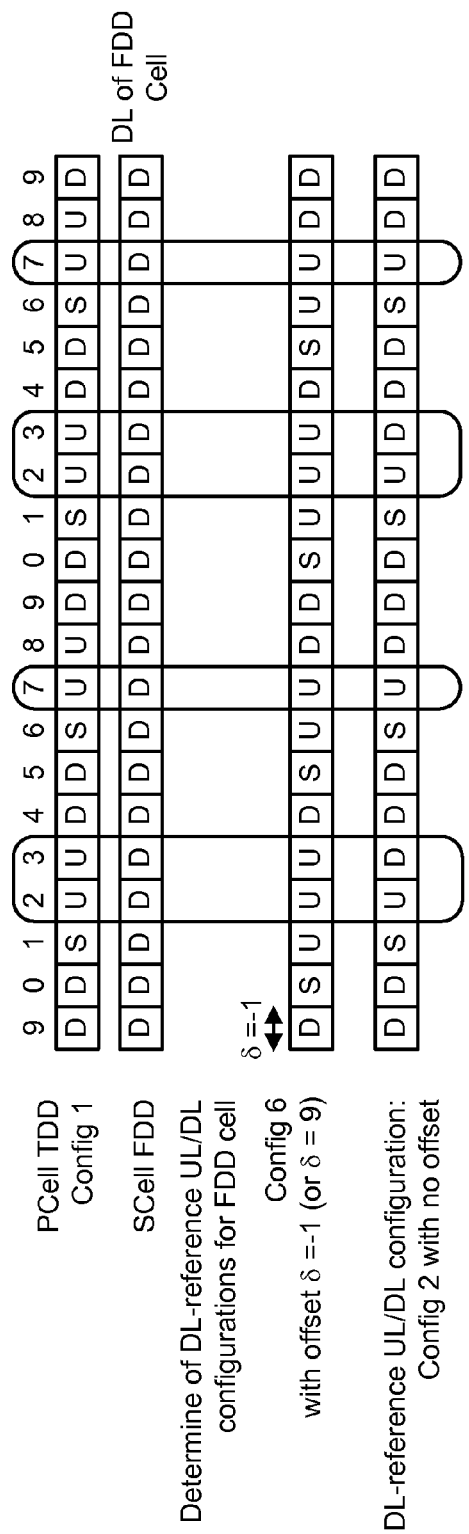
FIG. 12 illustrates an example of an FDD cell DL-reference configuration with a non-standard overlapping UL pattern.

FIG. 12 illustrates an example of an FDD cell DL-reference configuration with a non-standard overlapping UL pattern. If the overlapping UL subframes form a pattern that is not a standard UL/DL configuration, the DL-reference UL/DL configuration should be selected from the existing 7 UL/DL configurations with less UL subframes than the overlapping UL subframes. In the example illustrated, the PCell used UL/DL configuration 1 and the FDD SCell is configured with UL/DL configuration 6 with an offset 130 of −1 (or an offset 130 of 9, depending on the offset 130 range method used). The overlapping UL may form a pattern that is not a standard UL/DL configuration. Thus, a standard UL/DL configuration with less UL subframes should be used as the DL-reference configuration. In this example, the UL/DL configuration 2 with no offset 130 is determined as the DL-reference configuration of the FDD SCell.

An FDD cell and a TDD cell have different synchronization requirements. In TDD, the radio frames have to be tightly synchronized to avoid interference from different transmission directions from adjacent cells on the same frequency carrier. But in FDD, the radio frame synchronization is not as important.

In TDD-FDD CA, the cells may be scheduled by the same scheduler. Hence, it is expected that the radio frames are synchronized between FDD cells and TDD cells. However, if the radio frames are not synchronized between TDD cells and FDD cells, there will a large cost if the same synchronization requirement for TDD is also applied to FDD. Thus, there may be unsynchronized radio frames from a TDD cell and an FDD cell in TDD-FDD CA. This can cause some confusion on the timing issues, especially when TDD timing is applied on an FDD cell.

The subframe number n may be cell dependent in TDD-FDD CA. Different cells may have a different subframe number n in the same TTI. If the cells are not synchronized at the radio frame level, not only will the subframe number $n_c$ of cell c be potentially different from other cells but also the subframe index of subframe $n_c$ of cell c may be different from other cells. The subframe index may range from 0 to 9 because a radio frame always has 10 subframes.

If the radio frame is not synchronized, the same method can be applied but the subframe index number will be different. Thus, an offset 130 value should be added to the TDD index table to determine the actual subframe index number on an FDD cell. An offset 130 value of δ1 can be applied to synchronize the timing references when a TDD configuration is applied to an FDD cell. The offset 130 value δ1 can indicate the number of TTI or subframes to be shifted on the SCell for subframe index synchronization. The radio frame synchronization offset δ1 may be derived by the eNB 160 and the UE 102 automatically based on the synchronization signals or the radio frame synchronization offset δ1 may be signaled by the eNB 160 to the UE 102.

For radio frame synchronization (and for serving cell c), the offset $δ1_c$ can be configured by the eNB 160 based on the radio frame alignment difference. The offset $δ1_c$ can also be determined by a UE 102 based on the synchronization channels from the serving cell c and the PCell (i.e., by detecting the PSS/SSS signals). The UE 102 can then obtain the radio frame location of different cells and calculate the offset 130 values for $δ1_c$ accordingly.

If the PCell or reporting cell is a TDD cell, for an FDD serving cell c using a TDD UL/DL configuration with a TDD configuration offset $δ_c$, the downlink association set and HARQ-ACK for subframe $n_c$ of the FDD cell is determined based on Table (3) above, while the subframe index is determine by replacing subframe n with subframe $(n_c-δ_c)$.

If for a serving cell c, both the radio frame synchronization offset $δ1_c$ and the UL/DL configuration offset $δ_c$ are needed, the downlink association set and HARQ-ACK for subframe $n_0$ of the TDD PCell with cell index 0 (or reporting cell) is determined based on Table (3) above, while the subframe index is determine by replacing subframe n with subframe $(n_0-δ_c-δ1_c)$. In other words, the relative position on serving cell c is still the same by replacing subframe n with subframe $(n_c-δ_c)$. In another method, an overall offset $δ2_c=(δ1_c+δ_c)$ can be defined for serving cell c.

Thus, $δ1_c$ is a subframe offset 130 value of a radio frame between the FDD SCell c and the TDD PCell and $δ2_c$ is a subframe offset 130 value of a downlink association set of the FDD SCell from the TDD PCell radio frame indexes. The subframe $(n_c-δ_c)$ is defined, where $n_c$ is the subframe number of the concerned serving cell (e.g., FDD SCell) and $δ_c$ is the subframe offset 130 value of a downlink association set of the serving cell from a radio frame of the serving cell. The subframe index may be determined by replacing subframe n with subframe $(n_c-δ_c)$. $δ1_c$ is the subframe index of n0–the subframe index of $n_c$, where $n_0$ is the subframe index number of the PCell serving cell with cell index c=0 and nc is the subframe index number of a serving cell index c. If $δ1_c=0$, the serving cell c is synchronized with the PCell cell 0, and $δ_c=δ2_c$. By using $n_c$, it is possible to decouple a serving cell corresponding to HARQ-ACK timing and a serving cell on which the HARQ-ACK is transmitted. HARQ-ACK timing is considered in each serving cell and HARQ-ACK for serving cell #1 to be transmitted in subframe $n_1$ is transmitted in subframe $n_0$ of serving cell #0, where $n_0-n_1=δ1_c$ is known to the UE 102 and the eNB 160.

If the radio frame synchronization offset δ1 is determined by the UE 102 using synchronization signals, only the TDD configuration offset δ needs to be signaled for an FDD cell configured with a TDD UL/DL configuration. In one configuration, only the overall offset δ2 is signaled and the UE 102 may decide the TDD configuration offset δ based on δ2 and the measured radio frame synchronization offset δ1.

If the radio frame synchronization needs to be signaled explicitly, for a given cell, the eNB 160 may signal the radio frame synchronization δ1 or the overall offset δ2 in addition to the configuration offset δ.

Figure 13:
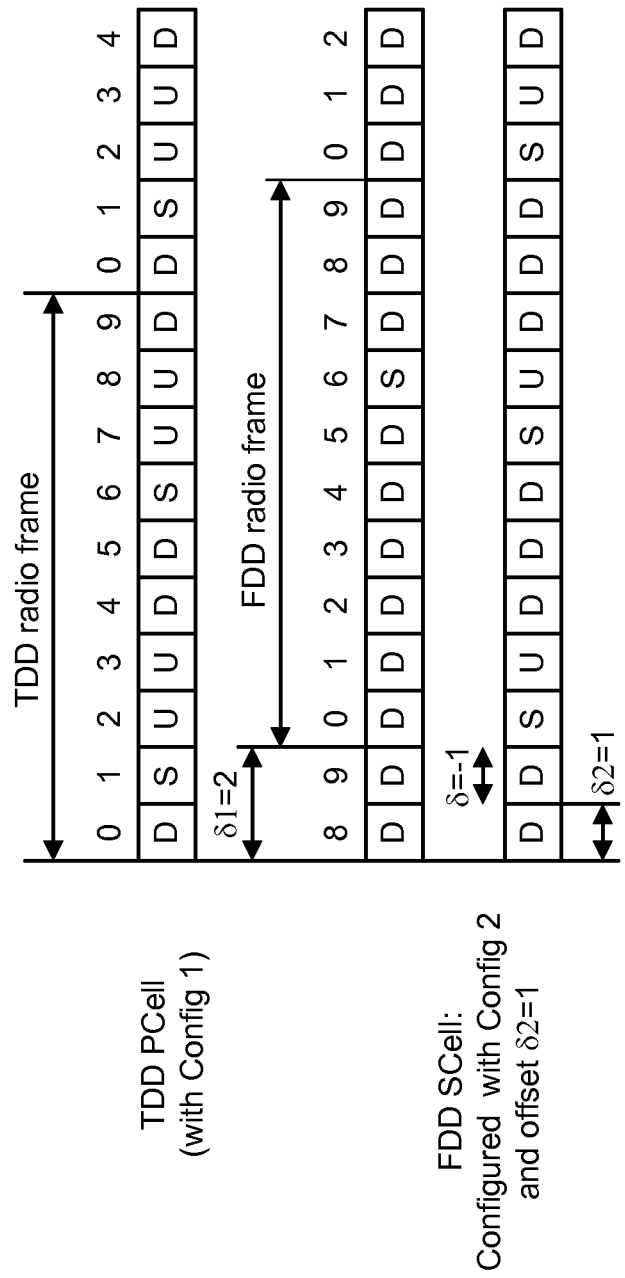
FIG. 13 illustrates an example of a radio frame synchronization offset and a TDD configuration offset on an FDD cell.

FIG. 13 illustrates an example of a radio frame synchronization offset 130 and a TDD configuration offset 130 on an FDD cell. In FIG. 13, a TDD-FDD CA with a TDD cell as PCell and an FDD cell as SCell are illustrated. The radio frame synchronization offset 130 is δ1=2 and the offset 130 for TDD configuration on an FDD cell is δ=−1. The overall offset δ2=δ1+δ=1.

If the PCell or reporting cell is an FDD cell, and the TDD cell follows its own timing, the radio frame synchronization offset δ1 should be used to synchronize the TDD subframe indexes. The offset 130 value δ1 can be a number to indicate the number of TTI or subframes to be shifted on the SCell for subframe index synchronization. The radio frame synchronization offset δ1 may be derived by the eNB 160 and UE 102 automatically based on the synchronization signals or the radio frame synchronization offset 130 may be signaled by the eNB 160 to a UE 102. For a TDD cell configured with a TDD UL/DL configuration, the downlink association set and HARQ-ACK for subframe n is determined based on Table (3) above, while the subframe index corresponding to the FDD cell is determine by replacing subframe n with subframe (n+δ1). In other words, the subframe index of a serving cell c is determined by replacing subframe n with $n_c$.

Figure 14:
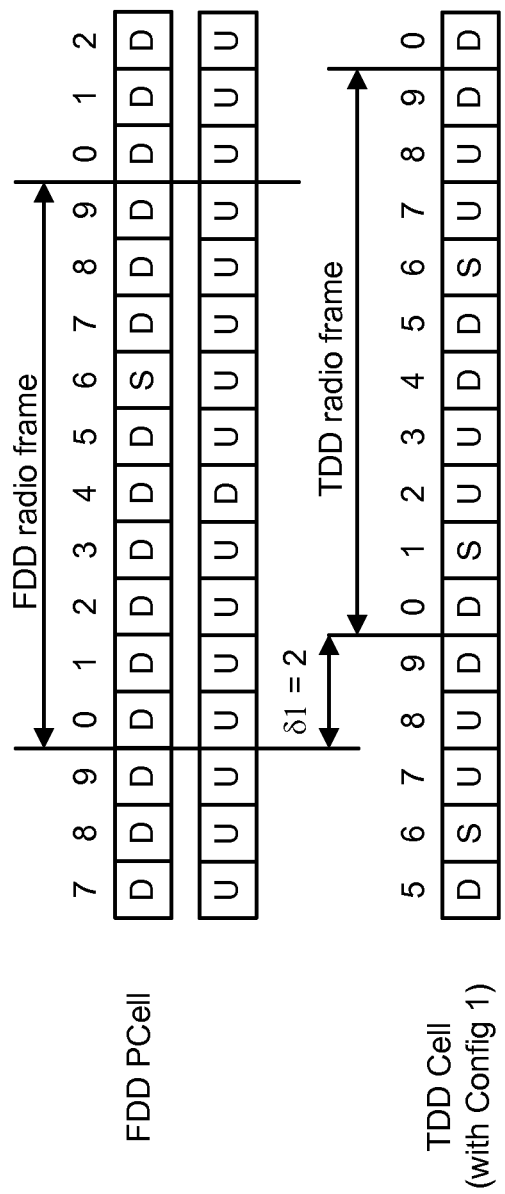
FIG. 14 illustrates an example of a radio frame synchronization offset for a TDD cell.
Figure 15:
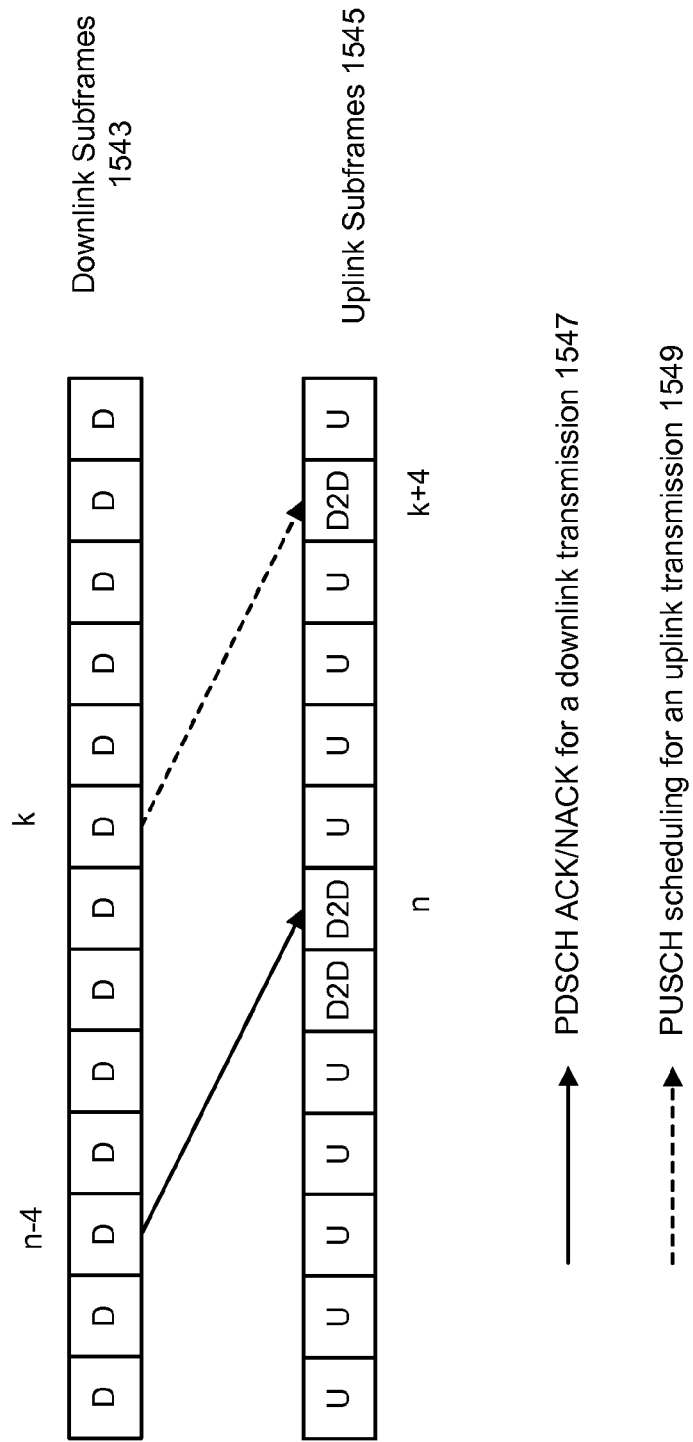
FIG. 15 illustrates potential collision issues between a D2D resource and a wide area network (WAN) transmission.

FIG. 14 illustrates an example of a radio frame synchronization offset 130 for a TDD cell. In FIG. 14, a TDD-FDD CA with an FDD cell as PCell and a TDD cell as SCell are illustrated. The radio frame synchronization offset 130 may be δ1=2. Thus, the HARQ-ACK reporting in TDD cells are in UL subframes 2, 3, 7 and 8 of the TDD index. With the offset 130 value, the corresponding HARQ-ACK report should be in UL subframe 4, 5, 9 and 0 on the FDD cell PUCCH reporting FIG. 15 illustrates potential collision issues between a device-to-device (D2D) resource and a wide area network (WAN) transmission. For an out-of-coverage UE 102, since the UE 102 is not connected with any eNB 160, a synchronization source may be used to perform subframe synchronization, and all subframes may be configured as D2D resources.

For an in-network coverage UE 102, the UE 102 is connected to an eNB 160, and the synchronization and D2D resource allocation may be determined by the eNB 160. For an FDD cell with D2D support, a subframe bitmap refers to a contiguous set of uplink subframes. And for FDD, the subframe bitmap length may be 40. Furthermore, the subframe bitmap for D2D resource allocation may include a subframe offset 130 value (e.g., offsetIndicatorInitialization). The subframe offset 130 may indicate the start of a resource pool within the subframe set. The subframe offset 130 may be used on a DL-reference UL/DL configuration to fit the D2D subframe bitmap.

From the UE's 102 perspective, in a UL subframe, a UE 102 cannot transmit UL signal at the WAN side if the UE 102 needs to transmit or receive a D2D signal. Thus, the D2D and WAN UL resources should be orthogonal to each other.

In FDD, there is a fixed 4 ms timing between a PDSCH transmission and the corresponding HARQ-ACK feedback, and between a PUSCH scheduling by a PDCCH/EPDCCH or a PHICH indication and the corresponding PUSCH transmission. If the same HARQ-ACK timing is maintained on an FDD cell, it may cause many issues.

As illustrated in FIG. 15, if the cell supporting D2D is a PCell and a PDSCH is transmitted in subframe n−4, and the subframe n is configured as a D2D resource, the UE 102 may not be able to report the HARQ-ACK for the PDSCH (as indicated by the PDSCH ACK/NACK for a downlink transmission 1547). Additionally, the UE 102 may not be able to perform the D2D communication.

Similarly, if a PUSCH is scheduled by PDCCH/EPDCCH or a PHICH in subframe k, and the subframe k+4 is configured as a D2D resource, the UE 102 may not be able to transmit the PUSCH (as indicated by the PUSCH scheduling for an uplink transmission 1549), or the UE 102 may not be able to perform the D2D communication.

For a PUSCH transmission, the eNB 160 may avoid such collision by scheduling implementations. However, if the PDSCH has to be disabled to avoid collision with D2D resources, the same number of DL subframes may be disabled as the number of subframes allocated for D2D resources. This may cause depredated peak rate performance and scheduling flexibility. Thus, it is important to support HARQ-ACK reporting of all DL subframes of the FDD cell in UL subframes that are not configured as D2D resources.

For TDD, the D2D service may only utilize UL subframes in a TDD UL/DL configuration. For TDD UL/DL configurations 1-5, a subframe bitmap length may be twice the number of uplink sub-frames within a radio frame. For TDD UL/DL configuration 6, the subframe bitmap length may be 30, which is six times the number of uplink sub-frames within a radio frame. For TDD UL/DL configuration 0, the subframe bitmap length may be 42, which is seven times the number of uplink sub-frames within a radio frame.

Similar issues exist for TDD cells when D2D resources are configured. If the current PDSCH timing is maintained, and if the HARQ-ACK of a PDSCH transmission is in a subframe configured as D2D resource, the HARQ-ACK may be dropped, or the D2D service may be interrupted. Therefore, some WAN and D2D avoidance mechanisms may be performed.

Figure 16:
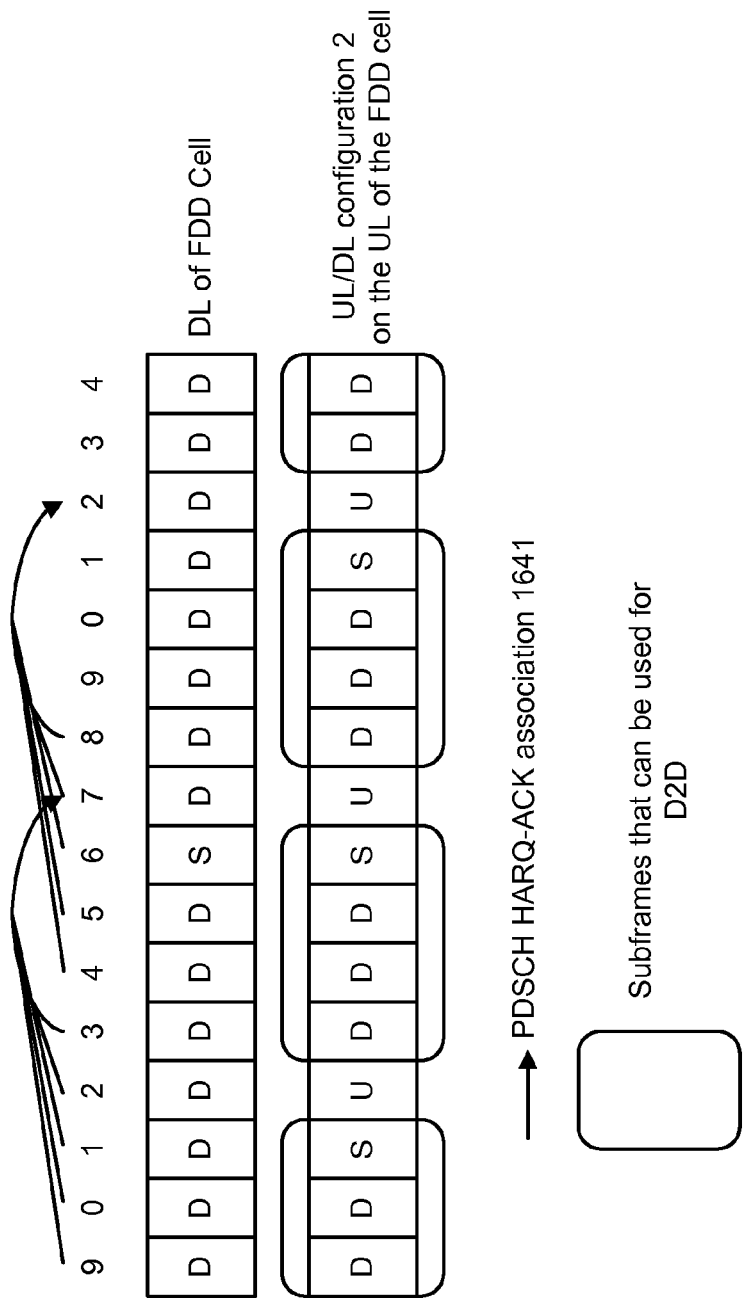
FIG. 16 illustrates an example of applying a TDD UL/DL configuration on an FDD cell for device-to-device (D2D) resource allocation.

FIG. 16 illustrates an example of applying a TDD UL/DL configuration on an FDD cell for D2D resource allocation. In LTE release-12, a new feature is supported for carrier aggregation with serving cells with different duplexes (i.e., FDD-TDD CA with FDD and TDD serving cells). If the PCell is a TDD cell with frame structure type 2, a downlink association set index K: $\{k_0, k_1, \ldots k_{M-1}\}$ for FDD-TDD for an FDD cell with serving cell frame structure type 1 may be utilized so that all DL subframes on an FDD cell can be reported on the UL subframes of the TDD PCell, as shown in Table (6) (from table 10.1.3A-1 of TS 36.213).

TABLE (6)

| DL-Reference UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 5 | 5, 4 | 4 | — | — | 6, 5 | 5, 4 | 4 |
| 1 | — | — | 7, 6 | 6, 5, 4 | — | — | — | 7, 6 | 6, 5, 4 | — |
| 2 | — | — | 8, 7, 6, 5, 4 | — | — | — | — | 8, 7, 6, 5, 4 | — | — |
| 3 | — | — | 11, 10, 9, 8, 7, 6 | 6, 5 | 5, 4 | — | — | — | — | — |
| 4 | — | — | 12, 11, 10, 9, 8, 7 | 7, 6, 5, 4 | — | — | — | — | — | — |

TABLE (6)-continued

| DL-Reference UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 5 | — | — | 13, 12, 11, 10, 9, 8, 7, 6, 5, 4 | — | — | — | — | — | — | — |
| 6 | — | — | 8, 7 | 7, 6 | 6, 5 | — | — | 7 | 7, 6, 5 | — |

The FDD-TDD CA method may be extended to an FDD cell with ProSe. For an FDD cell, a TDD UL/DL configuration may be configured and applied to a UL channel of the FDD cell. The UL/DL configuration may be referred as DL-reference UL/DL configuration, DL HARQ reference UL/DL configuration, DL-reference UL/DL configuration for D2D service, DL HARQ reference UL/DL configuration for D2D service, etc. The PDSCH HARQ-ACK reporting of the FDD cell may be mapped to the UL subframes of the reference configuration following the FDD-TDD carrier aggregation rules assuming a TDD PCell with the configured UL/DL configuration. Therefore, the UE 102 may apply a DL-reference UL/DL configuration to a UL carrier and FDD-TDD CA timing may be used for PDSCH HARQ-ACK reporting.

In this approach, the UL/DL configuration may be applied on the UL carrier of the FDD cell, and the subframes configured as UL of the UL/DL configuration may be used to report the HARQ-ACK of PDSCH transmissions of the DL subframes. The subframes configured as DL or special subframes of the UL/DL configuration may be used as D2D resources. In other words, a D2D subframe bitmap may be configured so that the D2D resources are from UL subframes that are not indicated as UL subframes in the DL-reference UL/DL configuration. It should be noted that the D2D resources may be configured in some or all of the subframes configured as DL or special subframes of the UL/DL configuration.

An example when UL/DL configuration 2 is configured on the FDD cell is illustrated in FIG. 16. The PDSCH HARQ-ACK reporting of all DL subframes of the downlink carrier may be reported on subframes 2 and 7 only (as indicated by the PDSCH HARQ-ACK associations 1641). All other UL subframes may be configured as D2D resources. If the potential D2D subframes are not configured as D2D resources by the D2D subframe bitmap, they may be used as regular UL subframes for the WAN LTE transmissions.

To ensure that a valid TDD UL/DL configuration can be supported for HARQ-ACK reporting, some limitations may be applied to the subframe bitmap of D2D resource allocation for an FDD cell. For example, subframe 2 of the FDD UL carrier may not be configured as a D2D resource. Furthermore, the maximum number of continuous subframes for D2D resources may be 9.

The likelihood that a subframe can be configured as D2D resources can be determined by several subframe groups. The preferred order of D2D resource allocation in a radio frame may be as follows: subframe group {0, 1, 5, 6}, >{9}, >{4}, >{3}, >{8}, >{7}, where the symbol "A>B" means that A is more preferred than B as a D2D resource. It should be noted that the FDD subframe bitmap contains 40 subframes that cover 4 radio frames.

The subframe bitmap for D2D resource allocation may be used to determine the HARQ-ACK reporting timing of the FDD cell. In one approach, the DL-reference TDD UL/DL configuration for a D2D enabled FDD cell can be determined by the D2D subframe bitmap based on the UL/DL configuration with the maximum number of UL subframes that are not configured as D2D resources.

To simplify network operation, in one implementation only TDD UL/DL configurations 2, 4 and 5 may be supported. In this implementation, the DL-reference TDD UL/DL configuration for a D2D enabled FDD cell can be derived based on the UL/DL configuration with the maximum number of UL subframes that are not configured as D2D resource and selected among UL/DL configurations 2, 4 and 5.

The PDSCH scheduling downlink control information (DCI) may follow the same rules as FDD-TDD CA when the PCell is a TDD cell. The PUSCH scheduling and HARQ-ACK may also follow the same rules as FDD-TDD CA when the PCell is a TDD cell (e.g., a PUSCH transmission in subframe n may be scheduled by a PDCCH/EPDCCH in subframe n−4, and the PHICH feedback may be in subframe n+6).

Figure 17:
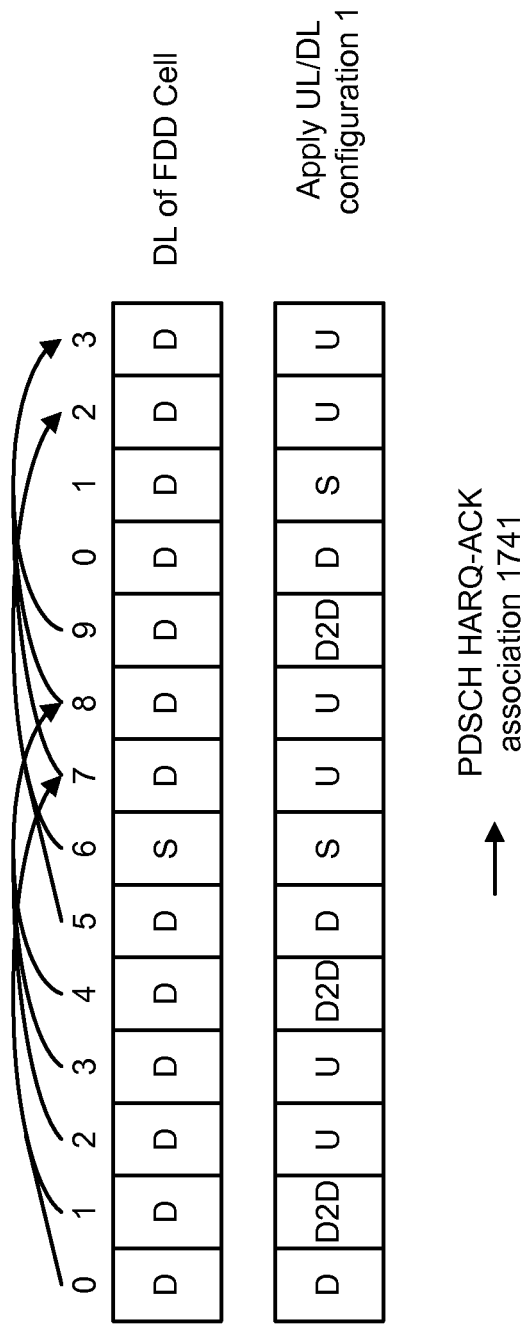
FIG. 17 illustrates an example for deriving the UL/DL configuration to be applied on an FDD cell.

FIG. 17 illustrates an example for deriving the UL/DL configuration to be applied on an FDD cell. In this example, subframe 1, 4 and 9 are configured as D2D resources by the subframe bitmap. Because the UL/DL configuration 1 has the maximum number of UL subframes that do not conflict with the D2D allocations, it is selected as the DL-reference UL/DL configuration. The PDSCH HARQ-ACK associations 1741 may follow the DL-reference UL/DL configuration. All subframes that are not configured as D2D resources by the D2D subframe bitmap are used as regular UL subframes for the WAN LTE transmissions, which includes all the subframes indicated as DL or special subframe by the applied UL/DL configuration on the FDD cell UL carrier.

Figure 18:
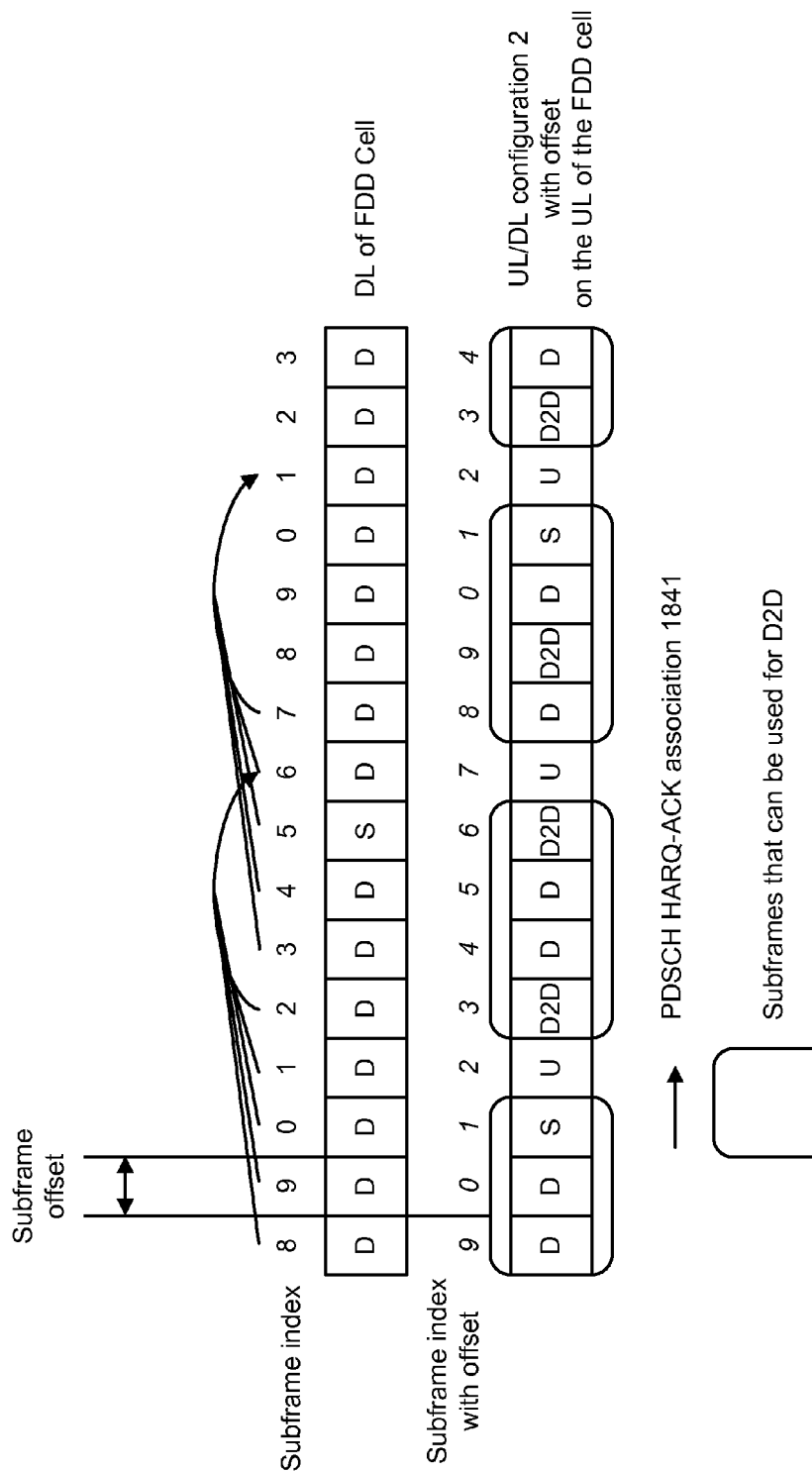
FIG. 18 illustrates an example of applying a TDD UL/DL configuration with an offset on an FDD cell for D2D resource allocation.

FIG. 18 illustrates an example of applying a TDD UL/DL configuration with an offset 130 on an FDD cell for D2D resource allocation. For an FDD cell, all UL subframes may be the same, to provide more flexibility of D2D resource allocation, and to consider potential unsynchronized adjacent networks, and possible different offset values (e.g., offsetIndicatorInitialization), in the subframe bitmap. The limitations of the subframe bitmap may be relaxed for an FDD cell.

In one approach, any subframe may be configured as a D2D resource, but the maximum number of continuous subframes for D2D resources is 9. In each radio frame included in the subframe bitmap, at least a subframe with the same index is not configured as D2D resource.

The UE 102 may apply a DL-reference UL/DL configuration with subframe offset 130 to a UL carrier. To support the relaxed D2D resource allocation, the DL-reference UL/DL configuration applied on an FDD UL carrier may also be configured with an offset 130 value.

FDD-TDD CA timing with subframe offset 130 may be used for PDSCH HARQ-ACK reporting. The PDSCH HARQ-ACK reporting of the FDD cell (e.g., the PDSCH HARQ-ACK association 1841) should map to the UL subframes of the reference configuration following the FDD-TDD carrier aggregation rules assuming a TDD PCell with the configured UL/DL configuration with an offset 130 value.

The D2D subframe bitmap may be configured so that the D2D resources are from UL subframes that are not indicated as UL subframes in the DL-reference UL/DL configuration with subframe offset 130. For the UL carrier, the subframes configured as UL of the UL/DL configuration may be used to report the HARQ-ACK of PDSCH transmissions of the DL subframes. The subframes configured as DL or special subframes of the UL/DL configuration can be used as D2D resources. It should be noted that the D2D resources may be configured in some or all of the subframes configured as DL or special subframes of the UL/DL configuration.

In the example illustrated in FIG. 18, a subframe bitmap that has subframe 2, 5 and 8 of each radio frame configured as D2D resources. An offset 130 may be applied to a valid TDD UL/DL configuration for the PDSCH HARQ-ACK reporting of the FDD cell. In this example, UL/DL configuration 2 with an offset 130 value of 1 is applied.

In another implementation, the DL-reference UL/DL configuration with subframe offset 130 may be determined by the D2D subframe bitmap based on the UL/DL configuration with a maximum number of UL subframes that are not configured as D2D resources. In this implementation, the subframe bitmap for D2D resource allocation may be used to determine the HARQ-ACK reporting timing of the FDD cell.

In one approach, the DL-reference TDD UL/DL configuration and the offset 130 value for a D2D enabled FDD cell can be derived based on the UL/DL configuration with the maximum number of UL subframes that are not configured as D2D resource. At least, TDD UL/DL configurations 2, 4 and 5 should be supported. The DL-reference TDD UL/DL configuration and offset 130 value for a D2D enabled FDD cell can be derived based on the UL/DL configuration with the maximum number of UL subframes that are not configured as D2D resource and selected among UL/DL configurations 2, 4 and 5.

Figure 19:
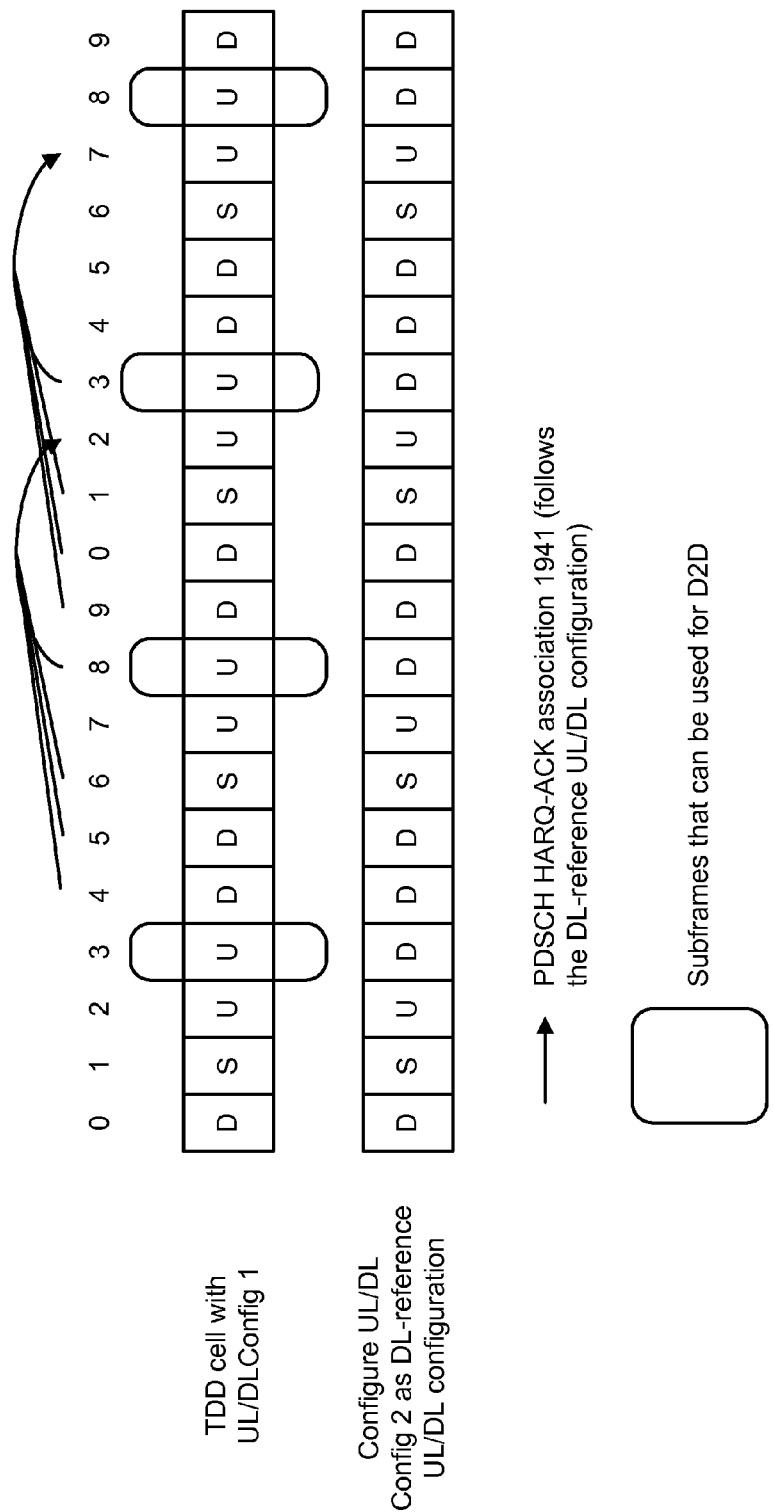
FIG. 19 illustrates an example of applying a TDD UL/DL configuration on a TDD cell for D2D resource allocation.

FIG. 19 illustrates an example of applying a TDD UL/DL configuration on a TDD cell for D2D resource allocation. As described above, for TDD UL/DL configurations 1-5, a subframe bitmap length may be twice the number of uplink sub-frames within a radio frame. For TDD UL/DL configuration 6, the subframe bitmap length may be 30, which is six times the number of uplink sub-frames within a radio frame. For TDD UL/DL configuration 0, the subframe bitmap length may be 42, which is seven times the number of uplink sub-frames within a radio frame.

For a TDD serving cell, a DL-reference UL/DL configuration may be applied over the TDD UL/DL configuration of the serving cell so that the PDSCH HARQ-ACK reporting (e.g., PDSCH HARQ-ACK association 1941) follows the DL-reference UL/DL configuration. The UL subframes in the DL-reference UL/DL configuration may be a subset of the UL subframes of the TDD serving cell UL/DL configuration. The remaining UL subframes of the TDD cell may be used as D2D resources. Therefore, the D2D subframe bitmap may be configured so that the D2D resources are from the UL subframes that are not indicated as UL subframes in a DL-reference UL/DL configuration.

An example with a TDD cell with UL/DL configuration 1 is illustrated in FIG. 19. The UL/DL configuration 2 is configured as the DL-reference UL/DL configuration, and the PDSCH timing of the TDD cell follows the DL-reference UL/DL configuration 2. Thus, UL subframes 3 and 8 can be used as D2D resources.

However, for a TDD cell configured with UL/DL configuration 5, there is only one UL subframe in each radio frame. If the UL subframe in a radio frame is configured as a D2D resource, there may always be a conflict between the D2D and UL transmission on the LTE side, and no valid UL/DL configuration can be used as DL-reference configuration.

A priority handling rule may be employed for ProSe if the cell is configured with TDD UL/DL configuration 5. In one method, the UE 102 may give LTE WAN traffic a higher priority. If a TDD cell is configured with UL/DL configuration 5 and D2D service, if there is any scheduled LTE UL transmissions (e.g. HARQ-ACK feedback, CSI report, and/or PUSCH transmission) on a subframe that is configured as a D2D resource by the subframe bitmap, the UE 102 may transmit the WAN LTE UL signal and ignore the D2D transmission or reception. In a slightly less strict method, the UE 102 may give priority on LTE UL only for HARQ-ACK and CSI feedback and may ignore the D2D communications in the given subframe.

In another method, the UE 102 may give D2D traffic a higher priority. Thus, the UE 102 may perform D2D transmission or reception and may discard the LTE UL transmission in the given subframe.

For other TDD UL/DL configurations 0, 1, 2, 3, 4 and 6, to make sure a valid TDD configuration can be supported for HARQ-ACK reporting, some limitations may be applied to the subframe bitmap of D2D resource allocation for a TDD cell. In one implementation, subframe 2 of the D2D subframe bitmap may not be configured as a D2D resource. The maximum number of continuous subframes for D2D resources may be one less than the number of UL subframes in a radio frame for the TDD cell UL/DL configuration.

In another implementation, the subframe bitmap for D2D resource allocation can be used to determine the HARQ-ACK reporting timing of the TDD cell. In one approach, the DL-reference TDD UL/DL configuration for a D2D enabled TDD cell can be determined by a D2D subframe bitmap based on the UL/DL configuration with the maximum number of UL subframes that are not configured as D2D resources.

To simplify the network operation, only TDD UL/DL configurations 2, 4 and 5 may be supported. Thus, the DL-reference TDD UL/DL configuration for a D2D enabled TDD cell can be derived based on the UL/DL configuration with the maximum number of UL subframes that are not configured as D2D resource and selected among UL/DL configurations 2, 4 and 5.

Figure 20:
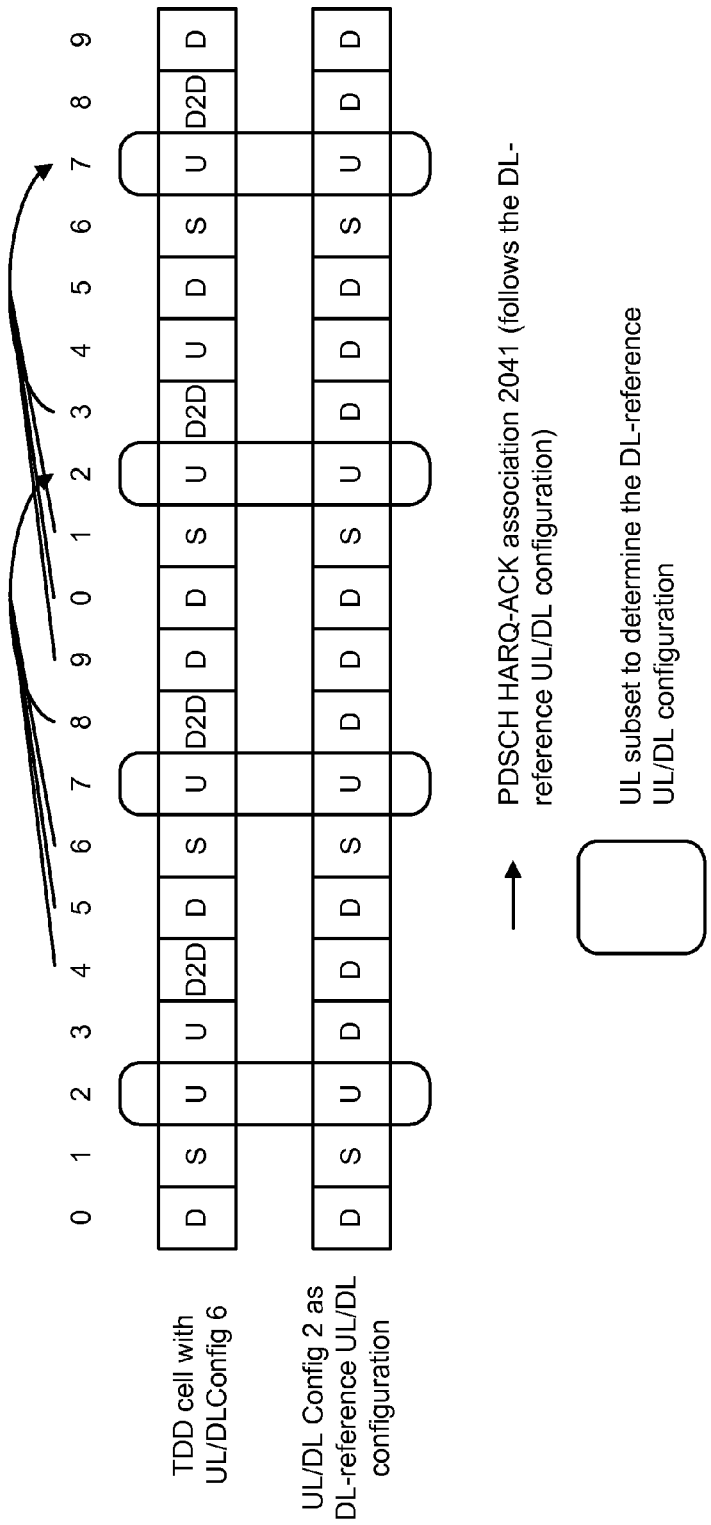
FIG. 20 illustrates an example of deriving a DL-reference UL/DL configuration based on a TDD subframe bitmap.

FIG. 20 illustrates an example of deriving a DL-reference UL/DL configuration based on a TDD subframe bitmap. In this example, a TDD cell is configured with UL/DL configuration 6, and subframes 3, 4 and 8 in different radio frames are configured as D2D resources by the subframe bitmap.

The UL/DL configuration 2 has the maximum number of UL subframes that do not conflict with the D2D allocations, thus this UL/DL configuration is selected as the DL-reference UL/DL configuration. The PDSCH HARQ-ACK associations 2041 may follow the DL-reference UL/DL configuration. All other UL subframes that are not configured as D2D resources by the D2D subframe bitmap may be used as regular UL subframes for the WAN LTE transmissions.

Figure 21:
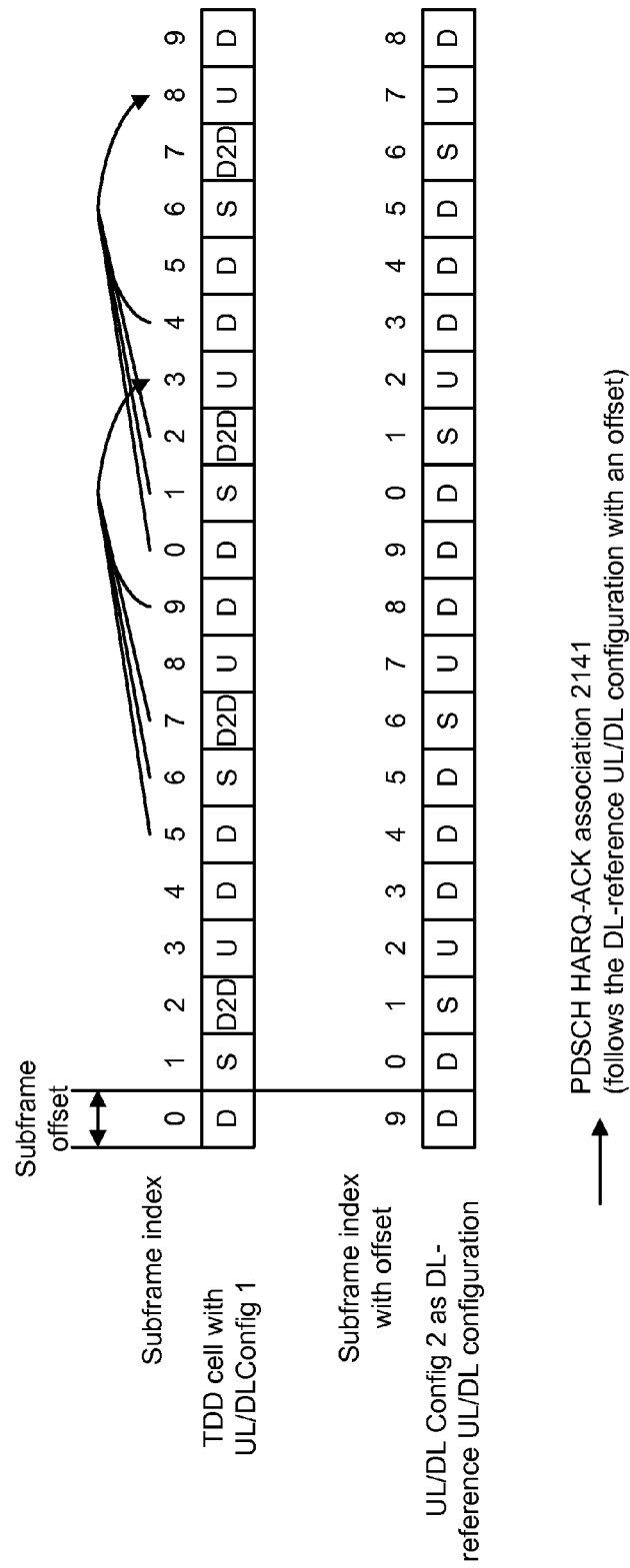
FIG. 21 illustrates an example of applying a TDD UL/DL configuration with an offset on a TDD cell for D2D resource allocation.

FIG. 21 illustrates an example of applying a TDD UL/DL configuration with an offset 130 on a TDD cell for D2D resource allocation. For a TDD cell, it may be beneficial to provide more flexibility for D2D resource allocation. Further, with a TDD cell, potential unsynchronized adjacent networks and possible different offset values (e.g., offset-IndicatorInitialization) in the bitmap may be considerations. Therefore, the limitations of the subframe bitmap may be relaxed for a TDD cell.

In one implementation, any subframe may be configured as D2D resource, but the maximum number of continuous subframes for D2D resources is one less than the number of UL subframes in a radio frame for the TDD cell UL/DL configuration. In each radio frame included in the subframe bitmap, at least one subframe with the same subframe index in each radio frame is not configured as D2D resource.

The UE 102 may configure a DL-reference UL/DL configuration with subframe offset 130 over a TDD UL/DL configuration of a serving cell. To support the relaxed D2D resource allocation, the DL-reference UL/DL configuration applied on a TDD UL carrier may also be configured with an offset 130 value. A UL subframe of a DL-reference UL/DL configuration with subframe offset 130 may be a subset of UL subframes of a TDD UL/DL configuration of the serving cell.

The DL-reference UL/DL configuration timing with subframe offset 130 may be used for PDSCH HARQ-ACK reporting. The PDSCH HARQ-ACK reporting of the TDD cell should map to the UL subframes of the reference configuration with an offset 130 value. The D2D subframe bitmap may be configured so that the D2D resources are from the UL subframes that are not indicated as UL subframes in the DL-reference UL/DL configuration.

In the example subframe bitmap illustrated in FIG. 21, subframes 2 and 7 of each radio frame are configured as D2D resources. Thus, an offset 130 may be applied to a valid TDD UL/DL configuration for the PDSCH HARQ-ACK reporting (indicated by the PDSCH HARQ-ACK association 2141) of the TDD cell. In this example, UL/DL configuration 2 with an offset 130 value of 1 is applied.

In another implementation, the DL-reference UL/DL configuration with subframe offset 130 may be determined by the D2D subframe bitmap based on a UL/DL configuration with a maximum number of UL subframes that are not configured as D2D resources. The subframe bitmap for D2D resource allocation can be used to determine the HARQ-ACK reporting timing of the TDD cell.

In one approach, the DL-reference TDD UL/DL configuration and the offset 130 value for a D2D enabled TDD cell can be derived base on the UL/DL configuration with the maximum number of UL subframes that are not configured as D2D resource. At least TDD UL/DL configurations 2, 4 and 5 should be supported. The DL-reference TDD UL/DL configuration and offset 130 value for a D2D enabled TDD cell can be derived based on the UL/DL configuration with the maximum number of UL subframes that are not configured as D2D resource and selected among UL/DL configurations 2, 4 and 5.

Figure 22:
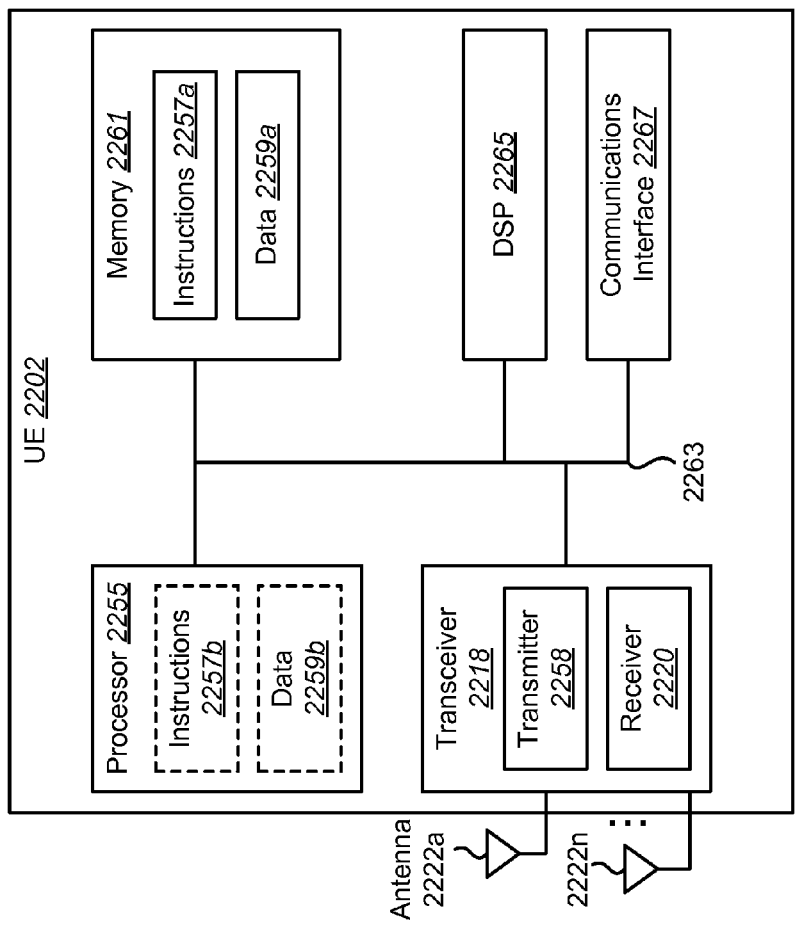
FIG. 22 illustrates various components that may be utilized in a UE.

FIG. 22 illustrates various components that may be utilized in a UE 2202. The UE 2202 described in connection with FIG. 22 may be implemented in accordance with the UE 102 described in connection with FIG. 1. The UE 2202 includes a processor 2255 that controls operation of the UE 2202. The processor 2255 may also be referred to as a central processing unit (CPU). Memory 2261, which may include read-only memory (ROM), random access memory (RAM), a combination of the two or any type of device that may store information, provides instructions 2257a and data 2259a to the processor 2255. A portion of the memory 2261 may also include non-volatile random access memory (NVRAM). Instructions 2257b and data 2259b may also reside in the processor 2255. Instructions 2257b and/or data 2259b loaded into the processor 2255 may also include instructions 2257a and/or data 2259a from memory 2261 that were loaded for execution or processing by the processor 2255. The instructions 2257b may be executed by the processor 2255 to implement one or more of the method 200 and 300 described above.

The UE 2202 may also include a housing that contains one or more transmitters 2258 and one or more receivers 2220 to allow transmission and reception of data. The transmitter(s) 2258 and receiver(s) 2220 may be combined into one or more transceivers 2218. One or more antennas 2222a-n are attached to the housing and electrically coupled to the transceiver 2218.

The various components of the UE 2202 are coupled together by a bus system 2263, which may include a power bus, a control signal bus and a status signal bus, in addition to a data bus. However, for the sake of clarity, the various buses are illustrated in FIG. 22 as the bus system 2263. The UE 2202 may also include a digital signal processor (DSP) 2265 for use in processing signals. The UE 2202 may also include a communications interface 2267 that provides user access to the functions of the UE 2202. The UE 2202 illustrated in FIG. 22 is a functional block diagram rather than a listing of specific components.

Figure 23:
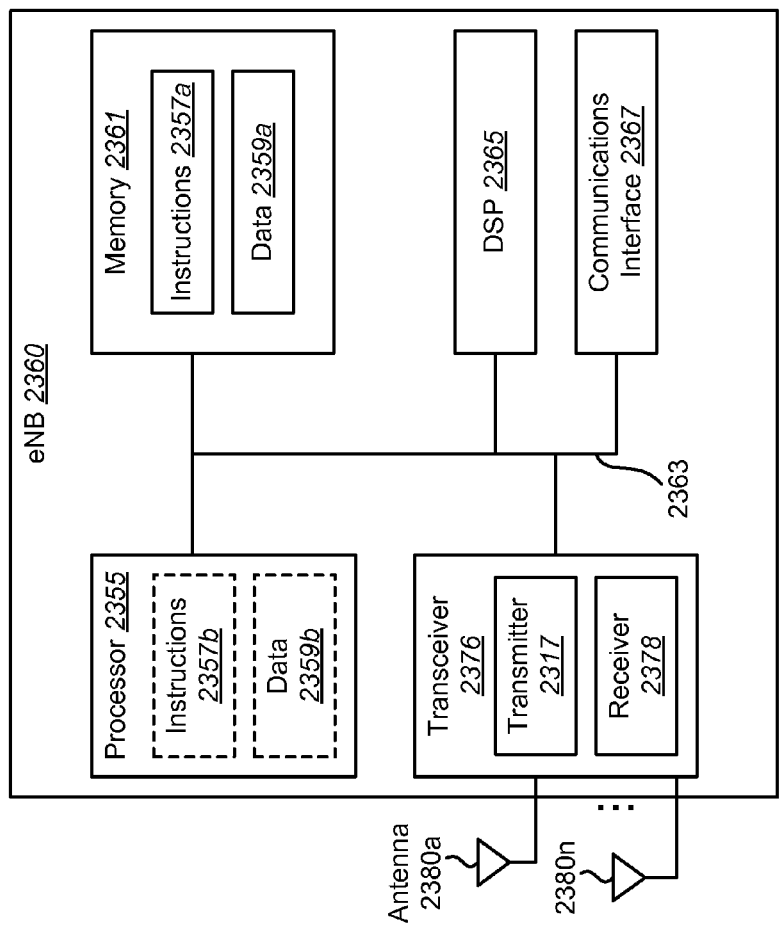
FIG. 23 illustrates various components that may be utilized in an eNB.

FIG. 23 illustrates various components that may be utilized in an eNB 2360. The eNB 2360 described in connection with FIG. 23 may be implemented in accordance with the eNB 160 described in connection with FIG. 1. The eNB 2360 includes a processor 2355 that controls operation of the eNB 2360. The processor 2355 may also be referred to as a central processing unit (CPU). Memory 2361, which may include read-only memory (ROM), random access memory (RAM), a combination of the two or any type of device that may store information, provides instructions 2357a and data 2359a to the processor 2355. A portion of the memory 2361 may also include non-volatile random access memory (NVRAM). Instructions 2357b and data 2359b may also reside in the processor 2355. Instructions 2357b and/or data 2359b loaded into the processor 2355 may also include instructions 2357a and/or data 2359a from memory 2361 that were loaded for execution or processing by the processor 2355.

The eNB 2360 may also include a housing that contains one or more transmitters 2317 and one or more receivers 2378 to allow transmission and reception of data. The transmitter(s) 2317 and receiver(s) 2378 may be combined into one or more transceivers 2376. One or more antennas 2380a-n are attached to the housing and electrically coupled to the transceiver 2376.

The various components of the eNB 2360 are coupled together by a bus system 2363, which may include a power bus, a control signal bus and a status signal bus, in addition to a data bus. However, for the sake of clarity, the various buses are illustrated in FIG. 23 as the bus system 2363. The eNB 2360 may also include a digital signal processor (DSP) 2365 for use in processing signals. The eNB 2360 may also include a communications interface 2367 that provides user access to the functions of the eNB 2360. The eNB 2360 illustrated in FIG. 23 is a functional block diagram rather than a listing of specific components.

Figure 24:
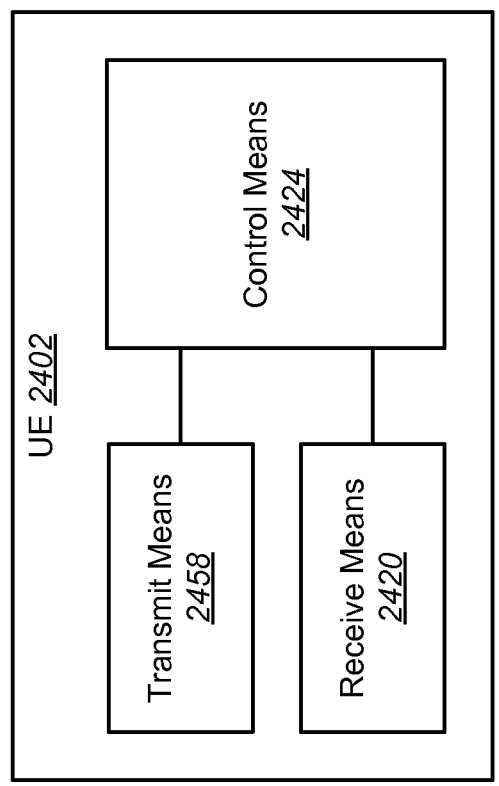
FIG. 24 is a block diagram illustrating one configuration of a UE in which systems and methods for performing carrier aggregation may be implemented.

FIG. 24 is a block diagram illustrating one implementation of a UE 2402 in which systems and methods for performing carrier aggregation may be implemented. The UE 2402 includes transmit means 2458, receive means 2420 and control means 2424. The transmit means 2458, receive means 2420 and control means 2424 may be configured to perform one or more of the functions described in connection with FIGS. 2 and 3 above. FIG. 22 above illustrates one example of a concrete apparatus structure of FIG. 24. Other various structures may be implemented to realize one or more of the functions of FIGS. 2 and 3. For example, a DSP may be realized by software.

Figure 25:
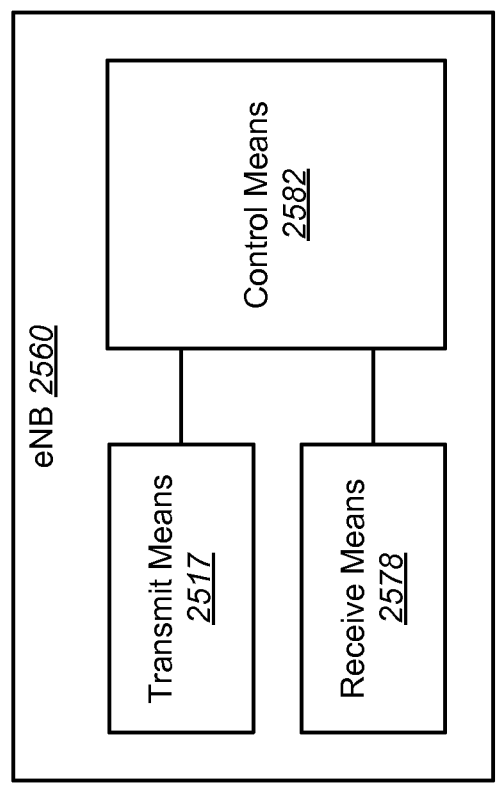
FIG. 25 is a block diagram illustrating one configuration of an eNB in which systems and methods for performing carrier aggregation may be implemented.

FIG. 25 is a block diagram illustrating one implementation of an eNB 2560 in which systems and methods for performing carrier aggregation may be implemented. The eNB 2560 includes transmit means 2517, receive means 2578 and control means 2582. The transmit means 2517, receive means 2578 and control means 2582 may be configured to perform one or more of the functions described above. FIG. 23 above illustrates one example of a concrete apparatus structure of FIG. 25. Other various structures may be implemented to realize one or more of the functions described above. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A user equipment (UE) for performing carrier aggregation, comprising:
   a processor;
   memory in electronic communication with the processor, wherein instructions stored in the memory are executable to:
   determine a duplex method of each of multiple serving cells for frequency-division duplexing (FDD) and time-division duplexing (TDD) carrier aggregation, wherein at least one of the serving cells is a TDD cell and at least one of the serving cells is a FDD cell;
   determine a subframe offset;
   determine physical downlink shared channel (PDSCH) Hybrid Automatic Repeat Request Acknowledgement/Negative Acknowledgement (HARQ-ACK/NACK) transmission timing for the FDD cell, wherein when a primary cell is a TDD cell, the PDSCH HARQ-ACK/NACK transmission timing for the FDD cell is determined based on a TDD configuration with the subframe offset; and
   send PDSCH HARQ-ACK/NACK information based on the PDSCH HARQ-ACK/NACK transmission timing,
   wherein the subframe offset causes a shift of a special subframe position.

2. The UE of claim 1, wherein timing references are also defined with an offset value when the TDD and FDD cells are not synchronized at radio frame level.

3. The UE of claim 2, wherein the offset value is used to indicate a number of transmission time intervals (TTIs) or subframes to be shifted on the SCell for subframe index synchronization.

4. A method for performing carrier aggregation by a user equipment (UE), comprising:
   determining a duplex method of each of multiple serving cells for frequency-division duplexing (FDD) and time-division duplexing (TDD) carrier aggregation, wherein at least one of the serving cells is a TDD cell and at least one of the serving cells is a FDD cell;
   determining a subframe offset;
   determining physical downlink shared channel (PDSCH) Hybrid Automatic Repeat Request Acknowledgement/ Negative Acknowledgement (HARQ-ACK/NACK) transmission timing for the FDD cell, wherein when a primary cell is a TDD cell, the PDSCH HARQ-ACK/NACK transmission timing for the FDD cell is determined based on a TDD configuration with the subframe offset; and
   sending PDSCH HARQ-ACK/NACK information based on the PDSCH HARQ-ACK/NACK transmission timing,
   wherein the subframe offset causes a shift of a special subframe position.

5. The method of claim 4, wherein timing references are also defined with an offset value when the TDD and FDD cells are not synchronized at radio frame level.

6. The method of claim 5, wherein the offset value is used to indicate a number of transmission time intervals (TTIs) or subframes to be shifted on the SCell for subframe index synchronization.

7. A user equipment (UE) for performing Long Term Evolution (LTE) device-to-device (D2D) proximity service (ProSe), comprising:
   a processor;
   memory in electronic communication with the processor, wherein instructions stored in the memory are executable to:
   determine a duplex method of each serving cell;
   determine that device-to-device (D2D) proximity service (ProSe) is configured on at least one serving cell;
   determine a D2D resource allocation based on a subframe bitmap;
   determine a subframe offset;

determine physical downlink shared channel (PDSCH) Hybrid Automatic Repeat Request Acknowledgement/Negative Acknowledgement (HARQ-ACK/NACK) transmission timing for a serving cell configured with D2D service;

send PDSCH HARQ-ACK/NACK information based on the PDSCH HARQ-ACK/NACK transmission timing; and perform D2D service on the subframes indicated by the D2D subframe bitmap, wherein for an FDD cell with ProSe, the instructions are further executable to apply a downlink (DL)-reference uplink/downlink (UL/DL) configuration to an uplink (UL) carrier, wherein FDD-TDD carrier aggregation (CA) timing is used for PDSCH HARQ-ACK/NACK reporting, and wherein the D2D subframe bitmap is configured so that the D2D resources are from UL subframes that are not indicated as UL subframes in the DL-reference UL/DL configuration.

8. The UE of claim 7, wherein when the UE is out-of-coverage a synchronization source is used to perform subframe synchronization, wherein all subframes may be configured as D2D resources.

9. The UE of claim 7, wherein when the UE is in coverage, the subframe offset is used on the DL-reference UL/DL configuration to fit the D2D subframe bitmap.

10. The UE of claim 7, wherein in the D2D subframe bitmap, the second subframe of the FDD UL carrier is not configured as a D2D resource, and wherein the maximum number of continuous subframes for the D2D resource is 9.

11. The UE of claim 7, wherein the DL-reference UL/DL configuration is determined by the D2D subframe bitmap based on a UL/DL configuration with a maximum number of UL subframes that are not configured as D2D resources.

12. A user equipment (UE) for performing Long Term Evolution (LTE) device-to-device (D2D) proximity service (ProSe), comprising:

a processor;

memory in electronic communication with the processor, wherein instructions stored in the memory are executable to:

determine a duplex method of each serving cell;

determine that device-to-device (D2D) proximity service (ProSe) is configured on at least one serving cell;

determine a D2D resource allocation based on a subframe bitmap;

determine a subframe offset;

determine physical downlink shared channel (PDSCH) Hybrid Automatic Repeat Request Acknowledgement/Negative Acknowledgement (HARQ-ACK/NACK) transmission timing for a serving cell configured with D2D service;

send PDSCH HARQ-ACK/NACK information based on the PDSCH HARQ-ACK/NACK transmission timing; and perform D2D service on the subframes indicated by the D2D subframe bitmap, wherein for an FDD cell with ProSe, the instructions are further executable to apply a downlink (DL)-reference uplink/downlink (UL/DL) configuration with subframe offset to an uplink (UL) carrier, wherein FDD-TDD carrier aggregation (CA) timing with subframe offset is used for PDSCH HARQ-ACK/NACK reporting, and wherein the D2D subframe bitmap is configured so that the D2D resources are from UL subframes that are not indicated as UL subframes in the DL-reference UL/DL configuration with subframe offset.

13. The UE of claim 12, wherein any subframe is configurable as a D2D resource, wherein the maximum number of continuous subframes for D2D resources is 9, and wherein for each radio frame included in the D2D subframe bitmap, at least one subframe with the same subframe index is not configured as a D2D resource.

14. The UE of claim 12, wherein the DL-reference UL/DL configuration with subframe offset is determined by the D2D subframe bitmap based on a UL/DL configuration with a maximum number of UL subframes that are not configured as D2D resources.

15. A user equipment (UE) for performing Long Term Evolution (LTE) device-to-device (D2D) proximity service (ProSe), comprising:

a processor;

memory in electronic communication with the processor, wherein instructions stored in the memory are executable to:

determine a duplex method of each serving cell;

determine that device-to-device (D2D) proximity service (ProSe) is configured on at least one serving cell;

determine a D2D resource allocation based on a subframe bitmap;

determine a subframe offset;

determine physical downlink shared channel (PDSCH) Hybrid Automatic Repeat Request Acknowledgement/Negative Acknowledgement (HARQ-ACK/NACK) transmission timing for a serving cell configured with D2D service;

send PDSCH HARQ-ACK/NACK information based on the PDSCH HARQ-ACK/NACK transmission timing; and perform D2D service on the subframes indicated by the D2D subframe bitmap, wherein if a TDD cell is configured with uplink/downlink (UL/DL) configuration 5 and D2D service, then for a subframe that is configured as a D2D resource by the subframe bitmap, if there is a wide area network (WAN) LTE uplink (UL) transmission, the instructions are further executable to:

transmit the WAN LTE UL; and ignore a D2D transmission and reception.

16. The UE of claim 7, wherein for a TDD cell with ProSe, the instructions are further executable to configure a DL-reference UL/DL configuration over the TDD UL/DL configuration of a serving cell, wherein a UL subframe of the DL-reference UL/DL configuration is a subset of UL subframes of a TDD UL/DL configuration of the serving cell, wherein the DL-reference UL/DL configuration timing is used for PDSCH HARQ-ACK/NACK reporting, and wherein the D2D subframe bitmap is configured so that the D2D resources are from the UL subframes that are not indicated as UL subframes in a DL-reference UL/DL configuration.

17. The UE of claim 16, wherein a second subframe of the D2D subframe bitmap is not configured as a D2D resource, and wherein the maximum number of continuous subframes for the D2D resource is one less than the number of UL subframes in a radio frame for the TDD cell UL/DL configuration.

18. The UE of claim 16, wherein the DL-reference UL/DL configuration is determined by the D2D subframe bitmap based on a UL/DL configuration with a maximum number of UL subframes that are not configured as D2D resources.

19. The UE of claim 7, wherein for a TDD cell with ProSe, the instructions are further executable to configure a DL-reference UL/DL configuration with subframe offset over a TDD UL/DL configuration of a serving cell, wherein a UL subframe of a DL-reference UL/DL configuration with subframe offset is a subset of UL subframes of a TDD UL/DL configuration of the serving cell, wherein a DL-reference UL/DL configuration timing with subframe offset is used for PDSCH HARQ-ACK/NACK reporting, and wherein the D2D subframe bitmap is configured so that the D2D resources are from the UL subframes that are not indicated as UL subframes in the DL-reference UL/DL configuration.

20. The UE of claim 19, wherein any subframe is configurable as a D2D resource, wherein the maximum number of continuous subframes for D2D resources is one less than the number of UL subframes in a radio frame for the TDD cell UL/DL configuration, and wherein for each radio frame included in the D2D subframe bitmap, at least one subframe with the same subframe index in each radio frame is not configured as a D2D resource.

21. The UE of claim 19, wherein the DL-reference UL/DL configuration with subframe offset is determined by the D2D subframe bitmap based on a UL/DL configuration with a maximum number of UL subframes that are not configured as D2D resources.

22. A method for performing Long Term Evolution (LTE) device-to-device (D2D) proximity service (ProSe) by a user equipment (UE), comprising:
   determining a duplex method of each serving cell;
   determining that device-to-device (D2D) proximity service (ProSe) is configured on at least one serving cell;
   determining a D2D resource allocation based on a subframe bitmap;
   determining a subframe offset;
   determining physical downlink shared channel (PDSCH) Hybrid Automatic Repeat Request Acknowledgement/Negative Acknowledgement (HARQ-ACK/NACK) transmission timing for a serving cell configured with D2D service;
   sending PDSCH HARQ-ACK/NACK information based on the PDSCH HARQ-ACK/NACK transmission timing; and
   performing D2D service on the subframes indicated by the D2D subframe bitmap,
   wherein for an FDD cell with ProSe, the method further comprises applying a downlink (DL)-reference uplink/downlink (UL/DL) configuration to an uplink (UL) carrier, wherein FDD-TDD carrier aggregation (CA) timing is used for PDSCH HARQ-ACK/NACK reporting, and wherein the D2D subframe bitmap is configured so that the D2D resources are from UL subframes that are not indicated as UL subframes in the DL-reference UL/DL configuration.

23. The method of claim 22, wherein when the UE is out-of-coverage a synchronization source is used to perform subframe synchronization, wherein all subframes may be configured as D2D resources.

24. The method of claim 22, wherein when the UE is in coverage, the subframe offset is used on a DL-reference UL/DL configuration to fit the D2D subframe bitmap.

25. A method for performing Long Term Evolution (LTE) device-to-device (D2D) proximity service (ProSe) by a user equipment (UE), comprising:
   determining a duplex method of each serving cell;
   determining that device-to-device (D2D) proximity service (ProSe) is configured on at least one serving cell;
   determining a D2D resource allocation based on a subframe bitmap;
   determining a subframe offset;
   determining physical downlink shared channel (PDSCH) Hybrid Automatic Repeat Request Acknowledgement/Negative Acknowledgement (HARQ-ACK/NACK) transmission timing for a serving cell configured with D2D service;
   sending PDSCH HARQ-ACK/NACK information based on the PDSCH HARQ-ACK/NACK transmission timing; and
   performing D2D service on the subframes indicated by the D2D subframe bitmap,
   wherein for an FDD cell with ProSe, the method further comprises applying a downlink (DL)-reference uplink/downlink (UL/DL) configuration with subframe offset to a UL carrier, wherein FDD-TDD CA timing with subframe offset is used for PDSCH HARQ-ACK/NACK reporting, and wherein the D2D subframe bitmap is configured so that the D2D resources are from UL subframes that are not indicated as UL subframes in the DL-reference UL/DL configuration with subframe offset.

26. A method for performing Long Term Evolution (LTE) device-to-device (D2D) proximity service (ProSe) by a user equipment (UE), comprising:
   determining a duplex method of each serving cell;
   determining that device-to-device (D2D) proximity service (ProSe) is configured on at least one serving cell;
   determining a D2D resource allocation based on a subframe bitmap;
   determining a subframe offset;
   determining physical downlink shared channel (PDSCH) Hybrid Automatic Repeat Request Acknowledgement/Negative Acknowledgement (HARQ-ACK/NACK) transmission timing for a serving cell configured with D2D service;
   sending PDSCH HARQ-ACK/NACK information based on the PDSCH HARQ-ACK/NACK transmission timing; and
   performing D2D service on the subframes indicated by the D2D subframe bitmap,
   wherein if a TDD cell is configured with uplink/downlink (UL/DL) configuration 5 and D2D service, then for a subframe that is configured as a D2D resource by the subframe bitmap, if there is a wide area network (WAN) LTE uplink (UL) transmission, the method further comprises:
   transmitting the WAN LTE UL; and
   ignoring a D2D transmission and reception.

27. The method of claim 22, wherein for a TDD cell with ProSe, the method further comprises configuring a DL-reference UL/DL configuration over the TDD UL/DL configuration of a serving cell, wherein a UL subframe of the DL-reference UL/DL configuration is a subset of UL subframes of a TDD UL/DL configuration of the serving cell, wherein the DL-reference UL/DL configuration timing is used for PDSCH HARQ-ACK/NACK reporting, and wherein the D2D subframe bitmap is configured so that the D2D resources are from the UL subframes that are not indicated as UL subframes in a DL-reference UL/DL configuration.

28. The method of claim 22, wherein for a TDD cell with ProSe, the method further comprises configure a DL-reference UL/DL configuration with subframe offset over a TDD UL/DL configuration of a serving cell, wherein a UL subframe of a DL-reference UL/DL configuration with subframe offset is a subset of UL subframes of a TDD UL/DL configuration of the serving cell, wherein a DL-reference UL/DL configuration timing with subframe offset is used for PDSCH HARQ-ACK/NACK reporting, and wherein the D2D subframe bitmap is configured so that the D2D resources are from the UL subframes that are not indicated as UL subframes in the DL-reference UL/DL configuration.

* * * * *